(12) United States Patent
Togawa

(10) Patent No.: US 12,139,218 B2
(45) Date of Patent: Nov. 12, 2024

(54) ROBOT

(71) Applicant: Sony Interactive Entertainment Inc., Tokyo (JP)

(72) Inventor: Keiji Togawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 668 days.

(21) Appl. No.: 17/367,961

(22) Filed: Jul. 6, 2021

(65) Prior Publication Data

US 2022/0009570 A1  Jan. 13, 2022

(30) Foreign Application Priority Data

Jul. 10, 2020 (JP) ................................ 2020-119284

(51) Int. Cl.
*B62D 57/032* (2006.01)
*G05D 1/00* (2024.01)

(52) U.S. Cl.
CPC ........... *B62D 57/032* (2013.01); *G05D 1/021* (2013.01)

(58) Field of Classification Search
CPC ....... B62D 57/032; B62D 57/02; G05D 1/021
See application file for complete search history.

(56) References Cited

U.S. PATENT DOCUMENTS

| | | | | |
|---|---|---|---|---|
| 5,159,988 A * | 11/1992 | Gomi | .................... | B25J 9/06 180/8.1 |
| 6,243,623 B1 * | 6/2001 | Takenaka | .............. | B62D 57/032 901/33 |
| 6,583,595 B1 | 6/2003 | Hattori | | |
| 6,898,485 B2 * | 5/2005 | Kuroki | .................. | B62D 57/032 901/1 |
| 7,053,577 B2 * | 5/2006 | Nagasaka | ............ | B62D 57/032 901/1 |
| 7,778,731 B2 * | 8/2010 | Ogawa | .................. | B62D 57/032 901/33 |
| 7,942,221 B1 * | 5/2011 | Tilden | .................. | B62D 57/032 180/8.1 |
| 7,946,364 B2 * | 5/2011 | Suga | .................... | B62D 57/032 180/8.1 |
| 9,073,209 B2 * | 7/2015 | Lee | ....................... | B62D 57/032 |
| 2003/0173926 A1 | 9/2003 | Hattori | | |

FOREIGN PATENT DOCUMENTS

| | | |
|---|---|---|
| JP | 2000296484 A | 10/2000 |
| JP | 2001150371 A | 6/2001 |
| JP | 2008126333 A | 6/2008 |
| JP | 2003117858 A | 6/2017 |
| JP | 2018167381 A | 11/2018 |

OTHER PUBLICATIONS

Notice of Reasons for Refusal for corresponding JP Application No. 2020-119284, 8 pages, dated Jun. 6, 2022.
1 Decision to Grant a Patent for corresponding JP Application No. 2020-119284, 5 pages, dated Sep. 20, 2022.

* cited by examiner

*Primary Examiner* — Tony H Winner
*Assistant Examiner* — Michael R Stabley
(74) *Attorney, Agent, or Firm* — Matthew B. Dernier, Esq.

(57) ABSTRACT

Disclosed herein is a robot including a yawing actuator that allows yawing of a trunk of the robot, a pitching actuator that is arranged above the yawing actuator and is supported by the yawing actuator, the pitching actuator allowing pitching of the trunk, and a rolling actuator that is arranged in a rear of the pitching actuator and is supported by the pitching actuator, the rolling actuator allowing rolling of the trunk.

12 Claims, 14 Drawing Sheets

ROBOT

CROSS REFERENCE TO RELATED APPLICATION

This application claims the benefit of Japanese Priority Patent Application JP 2020-119284 filed Jul. 10, 2020, the entire contents of which are incorporated herein by reference.

BACKGROUND

The present disclosure relates to a robot.

Robots that can walk on two legs and robots that can walk on four legs have been and are being developed (for example, refer to JP 2003-117858A). Some of robots that can walk on two legs can move the trunk thereof. For example, a robot has been developed which allows forward tilting (pitching) of the trunk, leftward and rightward tilting (rolling) of the trunk and so forth. Such movements as just mentioned are implemented by a plurality of actuators arranged at a lower portion or the waist of the trunk.

SUMMARY

If it is tried to achieve more complicated movements of the trunk of a robot, then the number of actuators to be arranged at a lower portion of the trunk increases. For example, in order to implement yawing of the trunk, namely, twisting of the trunk, in addition to pitching of the trunk and rolling of the trunk, three actuators are used for the trunk.

If the number of actuators to be arranged on the trunk is increased, then interference of parts of the trunk becomes likely to occur. Therefore, it becomes difficult to secure a sufficient movable range for the actuators.

As another problem, there is the possibility that, if the number of actuators to be arranged on the trunk is increased, then the height of the trunk may increase and the stability in movement of the robot may be reduced.

As a further problem, also there is a problem that, if the number of actuators to be arranged on the trunk is increased, then depending upon the layout of the actuator, the size in the forward and rearward direction of the trunk of the robot increases, resulting in increase of the overall size of the robot.

According to a first mode of the present disclosure, there is provided a robot including a yawing actuator that allows yawing of a trunk of the robot, a pitching actuator that is arranged above the yawing actuator and is supported by the yawing actuator, the pitching actuator allowing pitching of the trunk, and a rolling actuator that is arranged in a rear of the pitching actuator and is supported by the pitching actuator, the rolling actuator allowing rolling of the trunk. According to this robot, the tilting range to the front of the trunk can be secured sufficiently, and also the tilting range in the leftward and rightward direction of the trunk can be secured.

According to a second mode of the present disclosure, there is provided a robot including a left leg actuator that is located at an upper portion of a left leg portion of the robot and moves the left leg portion, a right leg actuator that is located at an upper portion of a right leg portion of the robot and moves the right leg portion, a yawing actuator that is located between the right leg actuator and the left leg actuator as viewed in front elevation of the robot and allows yawing of a trunk of the robot, and at least one actuator that is arranged above the yawing actuator and allows pitching of the trunk or rolling of the trunk. According to this robot, since the location of the yawing actuator can be lowered, stability in movement of the robot can be secured.

According to a third mode of the present disclosure, there is provided a robot including a pitching actuator that allows pitching of a trunk of the robot, the pitching actuator including an electric motor, a speed reduction mechanism, and a rotation outputting section that receives rotation of the electric motor through the speed reduction mechanism, the rotation outputting section being rotatable around a first center line extending along a leftward and rightward direction of the robot, and a rolling actuator that allows rolling of the trunk, the rolling actuator including an electric motor, a speed reduction mechanism, and a rotation outputting section that receives rotation of the electric motor through the speed reduction mechanism, the rotation outputting section being rotatable around a second center line extending along a forward and rearward direction of the robot. The pitching actuator and the rolling actuator are arranged side by side in the forward and rearward direction, a center of rotation of the electric motor in the pitching actuator is located on the first center line, and a center of rotation of the electric motor in the rolling actuator is spaced in a radial direction of the electric motor from the second center line. According to this robot, the size of the trunk of the robot in the forward and rearward direction can be reduced.

It is to be noted that the structure according to the first mode may be applied to a robot that does not have the structure according to the second or third mode. Similarly, the structure according to the second mode may be applied to a robot that does not have the structure according to the first or third mode. Further, the structure according to the third mode may be applied to a robot that does not have the structure according to the first or second mode.

DETAILED DESCRIPTION OF THE PREFERRED EMBODIMENT

Figure 1:
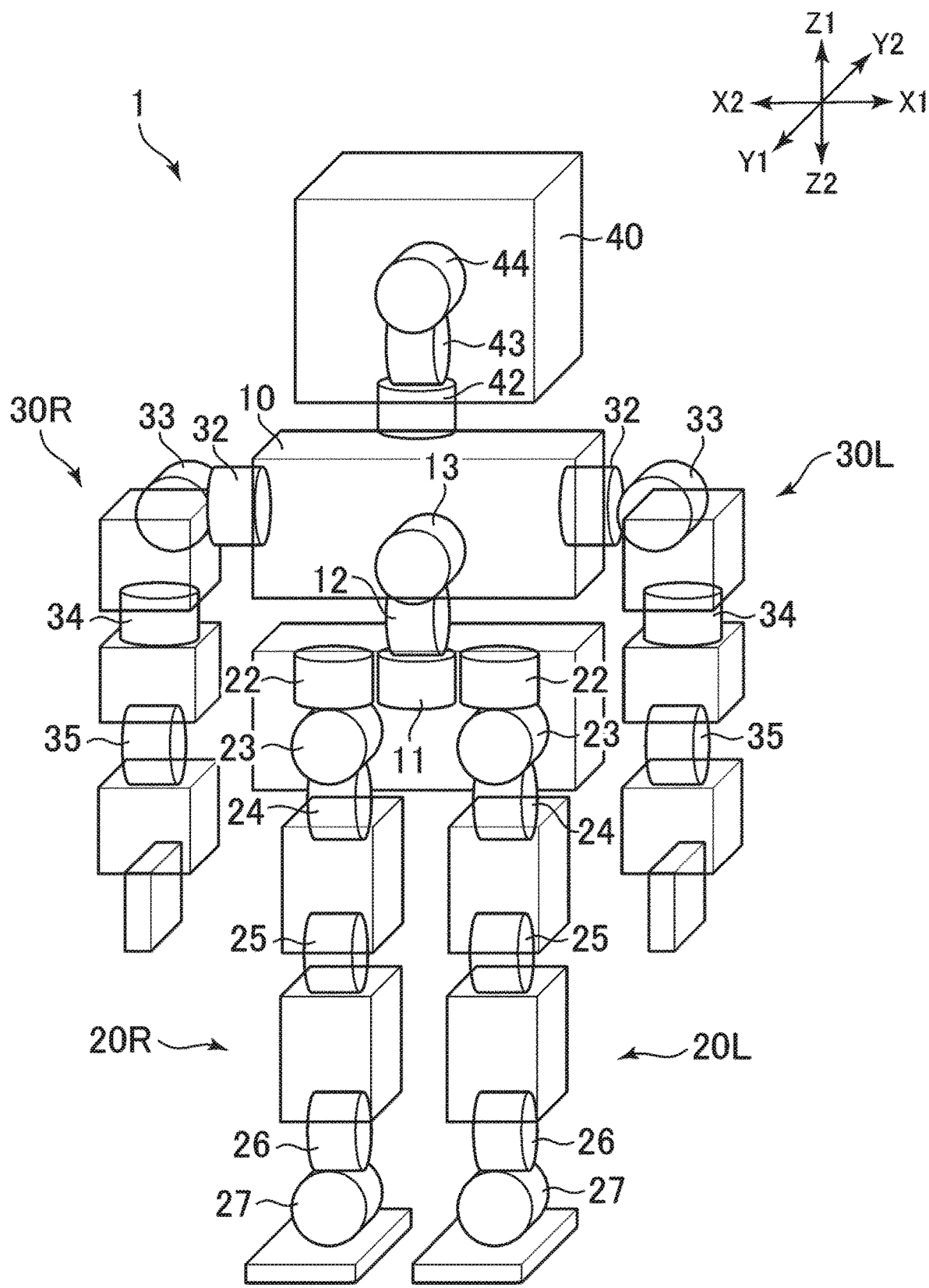
FIG. 1 is a schematic view depicting a layout of actuators a robot proposed in an embodiment of the present disclosure has.

In the following, an embodiment of the present disclosure is described with reference to the drawings. In the present specification, a robot 1 depicted in FIG. 1 and so forth is described as an example of the embodiment. Further, in the following description, directions indicated by X1 and X2 in FIG. 1 and so forth are referred to as leftward direction and rightward direction, respectively, and directions indicated by Z1 and Z2 in the drawings are referred to as upward direction and downward direction, respectively. Further, directions indicated by Y1 and Y2 in the drawings are referred to as forward direction and rearward direction, respectively.

(General Configuration)

The robot 1 is a robot that can walk on two legs and includes a right leg portion 20R and a left leg portion 20L as depicted in FIG. 1. A plurality of actuators for moving the right leg portion 20R and the left leg portion 20L are provided on the right and left leg portions 20R and 20L. Each of the leg portions 20R and 20L includes, for example, actuators 26 and 27 at a joint of the ankle thereof and includes an actuator 25 at a joint of the knee thereof, and further includes actuators 22, 23, and 24 at a hip joint thereof. Further, the robot 1 includes a right arm portion 30R and a left arm portion 30L. A plurality of actuators for moving the arm portions 30R and 30L are provided at the arm portions 30R and 30L. Each of the arm portions 30R and 30L includes an actuator 35 at a joint of the elbow thereof and includes an actuator 34 at the upper arm thereof, and further includes actuators 32 and 33 at a joint of the shoulder. Further, the robot 1 includes a plurality of actuators 42, 43, and 44 for moving a head portion 40 thereof.

The layout of the actuators in the robot 1 is not limited to that depicted in FIG. 1. For example, the robot 1 may not necessarily include the actuators 42, 43, and 44 provided at the head portion. Further, the number of actuators provided at the arm portions 30R and 30L may be smaller than four. Similarly, the number of actuators provided at the leg portions 20R and 20L may be smaller than six.

(Actuators for Trunk)

The robot 1 includes a plurality of, three in FIG. 1, actuators 11, 12, and 13 for moving a trunk 10. In particular, the robot 1 includes a yawing actuator 11 that allows yawing of the trunk 10, a pitching actuator 12 that allows pitching of the trunk 10, and a rolling actuator 13 that allows rolling of the trunk 10. The term "yawing" represents a movement of the trunk 10 around an axial line extending along an upward and downward direction and the term "pitching" represents a movement of the trunk 10 around an axial line extending along a leftward and rightward direction. Further, the term "rolling" represents a movement of the trunk 10 around an axial line extending along a forward and rearward direction.

The three actuators 11, 12, and 13 are arranged at a lower portion, namely, at the waist, of the trunk 10. The trunk 10 has, arranged at an upper portion thereof, the actuators 32 for moving the arm portions 30R and 30L and the actuator 42 for moving the head portion 40. The actuators 32 are individually located at the uppermost portion of the arm portions 30R and 30L, and the actuator 42 is located at the lowermost portion among the three actuators 42, 43, and 44.

The actuators 11, 12, and 13 for moving the trunk 10 individually include an electric motor, a speed reduction mechanism, and a rotation outputting section for receiving rotation of the electric motor through the speed reduction mechanism. As the electric motor, for example, a stepping motor can be used. The rotation outputting section is located at a terminal end of a torque transmission path in the actuator and is connected to some other part of the robot 1, which is a movable portion of the robot 1. The speed reduction mechanism can include, for example, a plurality of external tooth gears, a worm gear, and a planetary gear.

Figure 4B:
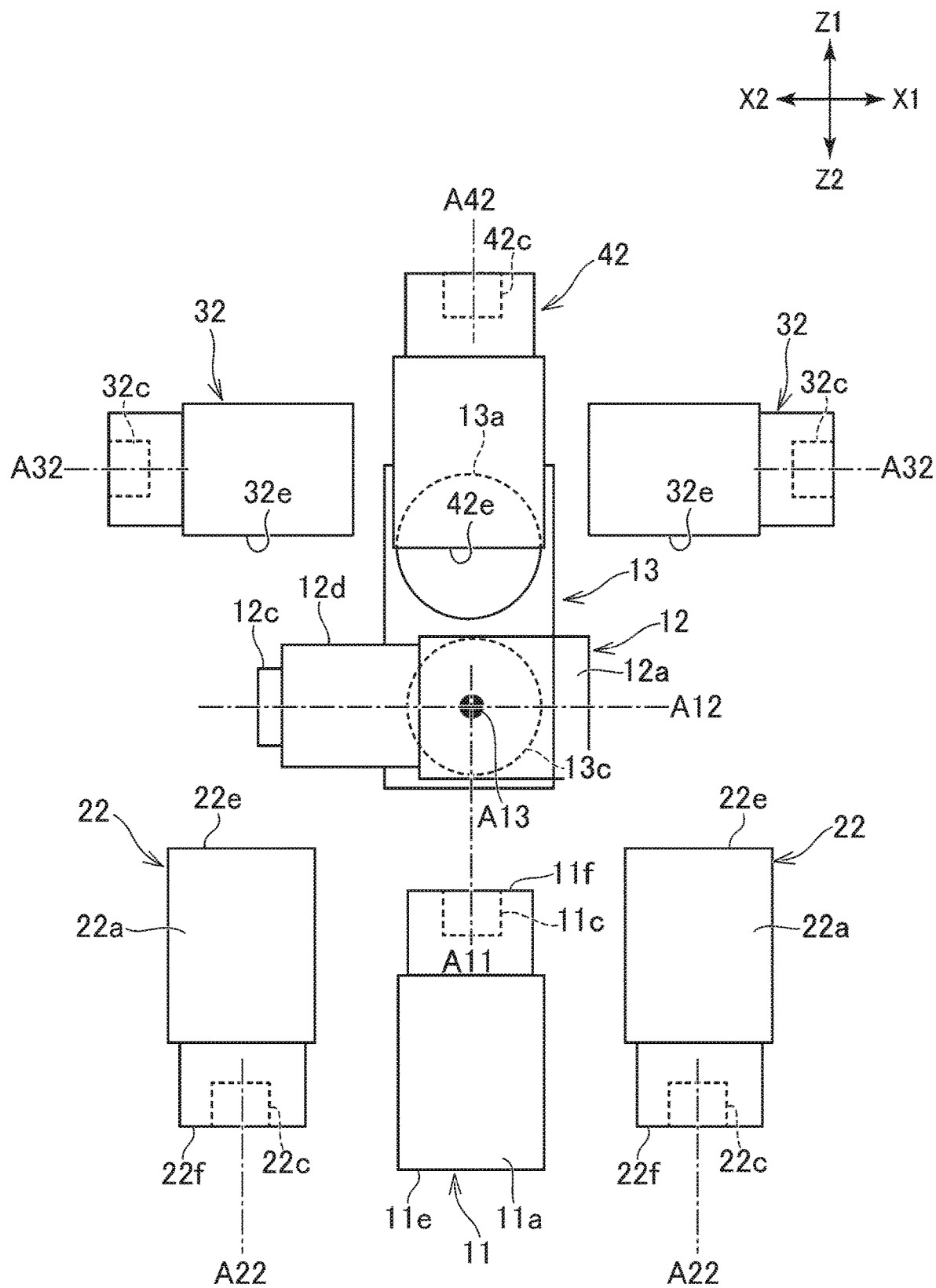
FIG. 4B is a front elevational view depicting relative positions of the actuators.
Figure 5A:
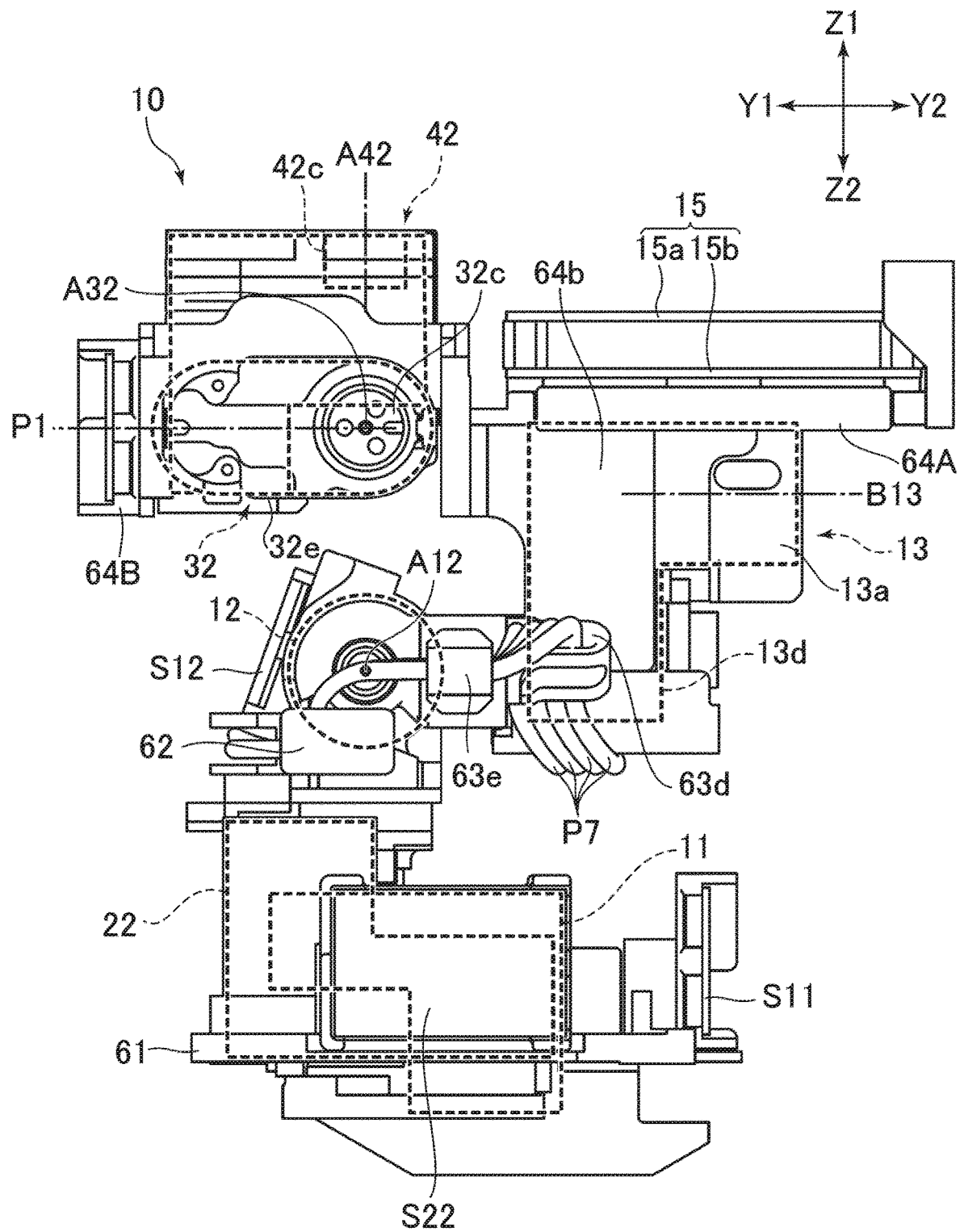
FIG. 5A is a right side elevational view of the parts depicted in FIG. 2A.
Figure 5B:
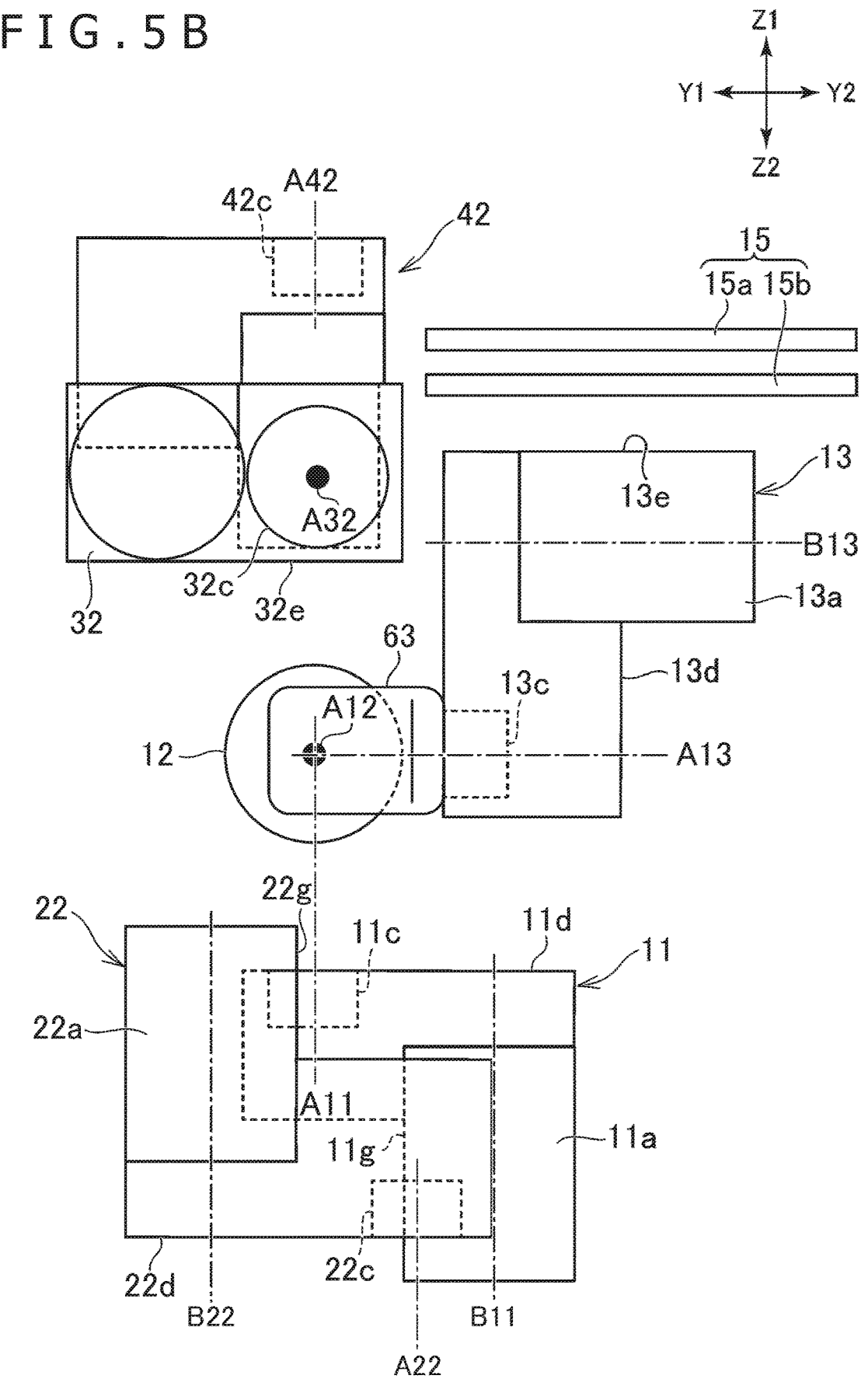
FIG. 5B is a right side elevational view depicting a relative position of the actuators.
Figure 6:
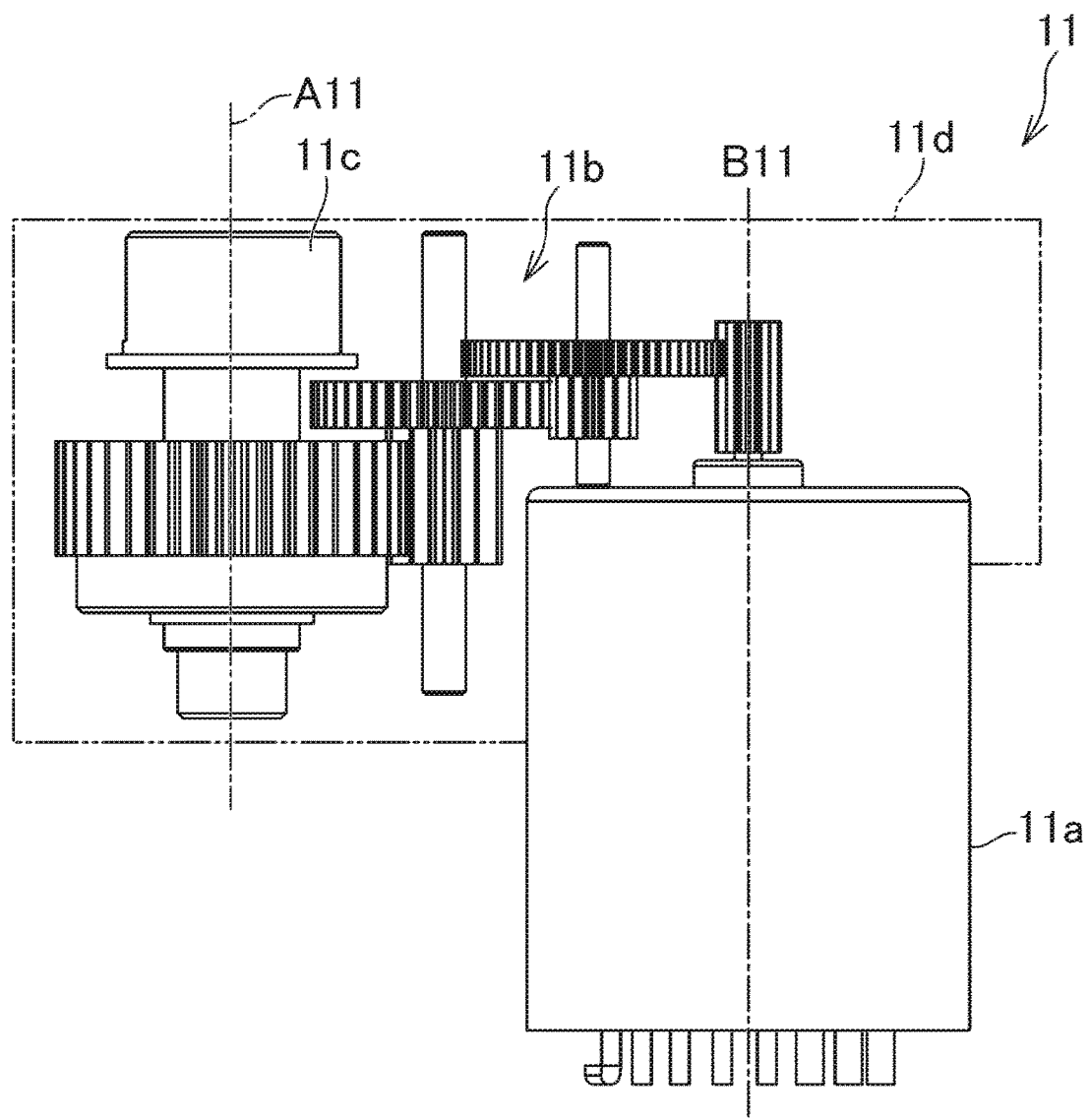
FIG. 6 is a view depicting an internal structure of the actuators.

For example, as depicted in FIG. 6, the yawing actuator 11 includes an electric motor 11a, a speed reduction mechanism 11b, and a rotation outputting section 11c for receiving rotation of the electric motor through the speed reduction mechanism 11b. The speed reduction mechanism 11b includes a plurality of external tooth gears. The speed reduction mechanism 11b is accommodated in a case 11d. The case 11d may hold the electric motor 11a. The electric motor 11a drives around a rotation center line B11 extending along the upward and downward direction. The rotation outputting section 11c of the yawing actuator 11 rotates around a rotation center line A11 extending in parallel to the rotation center line B11. A rotation outputting section 12c of the pitching actuator 12 (refer to FIG. 4B) rotates around a rotation center line A12 extending along the leftward and rightward direction. A rotation outputting section 13c of the rolling actuator 13 (refer to FIG. 5B) rotates relative to an electric motor 13a around a rotation center line A13 extending along the forward and rearward direction. It is to be noted that one or plural ones of the actuators 11, 12, and 13 may not include a speed reduction mechanism. In this case, the rotation outputting section may be a rotary shaft of the electric motor.

(Yawing Actuator)

As depicted in FIG. 1, the leg portions 20R and 20L individually include, at an uppermost portion thereof, an actuator 22 for moving the leg portions 20R and 20L. In the following description, the actuator 22 is referred to as a "leg actuator." As depicted in FIG. 4B, the yawing actuator 11 is located between the leg actuator 22 of the right leg portion 20R and the leg actuator 22 of the left leg portion 20L as viewed in front elevation of the robot 1. As viewed in front elevation of the robot 1, the position of a lower end 11e of the yawing actuator 11 is lower than an upper end 22e of the left and right leg actuators 22. The remaining actuators for moving the trunk 10, particularly the pitching actuator 12 and the rolling actuator 13, are arranged above the yawing actuator 11. According to this arrangement of the yawing actuator 11, the location of the actuators 11, 12, and 13 for moving the trunk 10 can be lowered as a whole, and therefore, the position of the center of gravity of the robot 1 is lowered and the stability of the motion of the robot 1 can be enhanced.

The structure of the left and right leg actuators 22 is same as that of the yawing actuator 11. In particular, the left and right leg actuators 22 individually include an electric motor 22a (refer to FIG. 2B), a speed reduction mechanism, and a rotation outputting section 22c (refer to FIG. 3A) for receiving rotation of the electric motor 22a through the speed reduction mechanism. The rotation outputting section 22c of the left and right leg actuators 22 can rotate, for example, around a rotation center line A22 (refer to FIG. 3A) extending along the upward and downward direction, and the left and right leg actuators 22 change the orientation of the left leg portion 20L and the orientation of the right leg portion 20R, respectively. Also the electric motor 22a drives around a rotation center line extending along the upward and downward direction. The structure of the leg actuators 22 is not limited to that of the robot 1. For example, rotation of the electric motor 22a may be transmitted to the rotation outputting section 22c through a speed reduction mechanism including a worm gear or a speed reduction mechanism including a planetary gear.

As depicted in FIG. 4B, the yawing actuator 11 may be located lower than the left and right leg actuators 22 as a whole. In particular, the position of an upper end 11f of the yawing actuator 11 may be lower than an upper end 22e of the left and right leg actuators 22. In the example of the robot 1, the position of the upper face of the rotation outputting section 11c of the yawing actuator 11 is lower than the upper end 22e of the electric motor 22a of the leg actuators 22. According to this arrangement of the yawing actuator 11, since the location of the other actuators 12 and 13 for moving the trunk 10 can be lowered furthermore, the stability of movement of the robot 1 can be enhanced.

Further, as depicted in FIG. 4B, the position of the lower end 11e of the yawing actuator 11 may be lower than a lower end 22f of the leg actuators 22. In the example of the robot 1, the position of the lower end 11e of the electric motor 11a of the yawing actuator 11 is lower than a lower face of the rotation outputting section 22c of the leg actuators 22. Consequently, since the location of the entire yawing actuator 11 is lowered, the stability of the motion of the robot 1 can be enhanced.

Figure 4A:
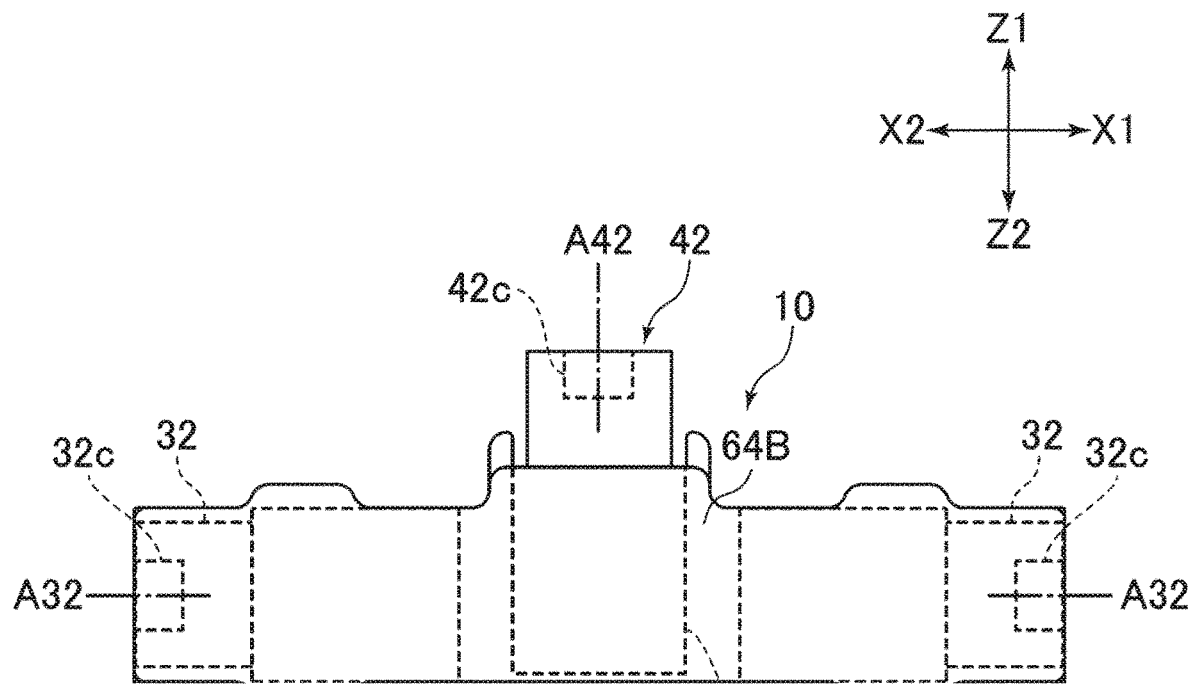
FIG. 4A is a front elevational view of actuators and a frame depicted in FIG. 2A.
Figure 4A:
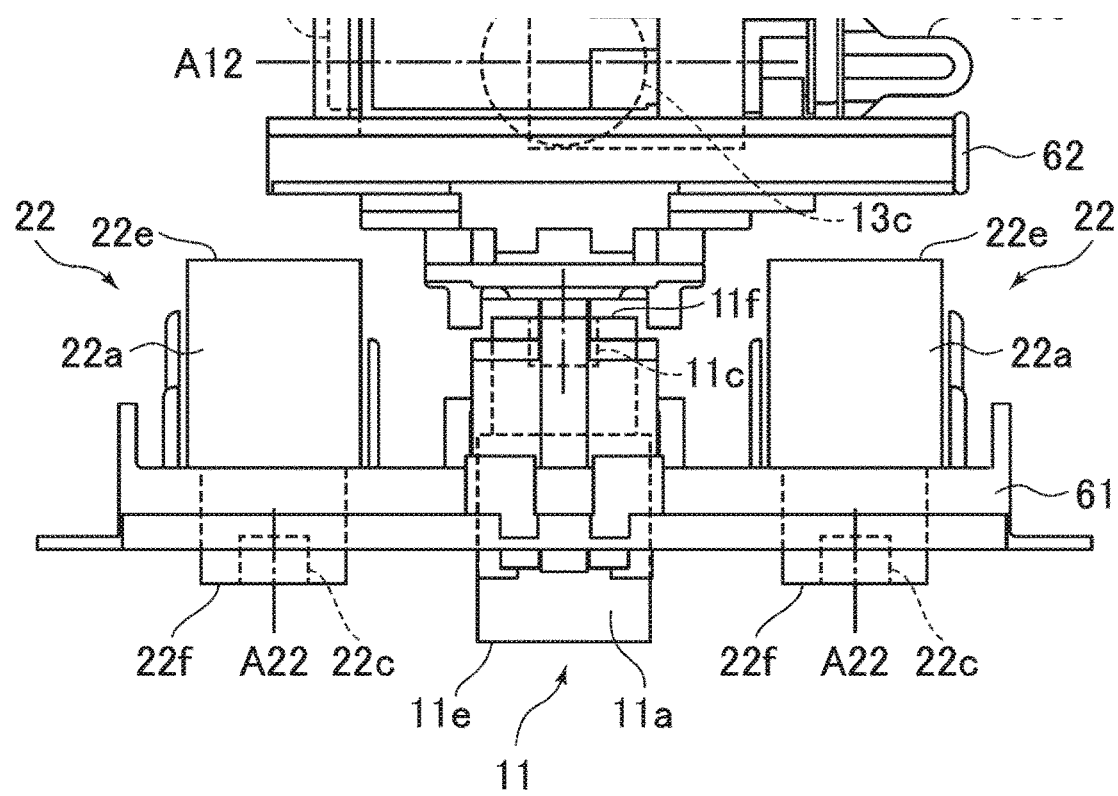

As depicted in FIG. 4A, the left and right leg actuators 22 and the yawing actuator 11 are attached to a common frame 61. The electric motor 22a of the left and right leg actuators 22 is arranged on the upper side of the frame 61. A lowermost portion of the electric motor 11a of the yawing actuator 11 projects downwardly from the frame 61.

As depicted in FIG. 6, in the yawing actuator 11, the rotation outputting section 11c is spaced in a radial direction from the rotation center line B11 of the electric motor 11a, namely, from a rotary shaft of the electric motor 11a. The speed reduction mechanism 11b is arranged between the rotary shaft of the electric motor 11a and the rotation outputting section 11c, and transmits rotation of the electric motor 11a in a reduced speed to the rotation outputting section 11c. By using the actuator whose rotation outputting section is spaced away from the rotation center line of the electric motor as the yawing actuator 11 in this manner, the height of the yawing actuator 11 can be reduced. As a result, the location of the other actuators 12 and 13 for moving the trunk 10 can be lowered. In the robot 1, the structure of the leg actuators 22 is same as that of the yawing actuator 11. Accordingly, also the rotation outputting section 22c of the leg actuators 22 is spaced in a radial direction from the rotation center line of the electric motor 22a of the leg actuators 22.

As depicted in FIG. 5B, at least part of the yawing actuator 11 may overlap with the left and right leg actuators 22 as viewed in side elevation of the robot 1. According to this arrangement of the actuators 11 and 22, increase in size in the forward and rearward direction of the robot 1 can be prevented.

As depicted in FIG. 5B, in the example of the robot 1, the rotation center line A11 of the rotation outputting section 11c of the yawing actuator 11 is spaced forwardly from the electric motor 11a of the yawing actuator 11. On the other hand, the rotation center line A22 of the rotation outputting section 22c of the leg actuators 22 is spaced rearwardly from the electric motor 22a of the leg actuators 22. In other words, the direction in which the rotation outputting section 11c is located with respect to the electric motor 11a in the yawing actuator 11, namely, the forward direction, and the direction in which the rotation outputting section 22c is located with respect to the electric motor 22a in the leg actuators 22, namely, the rearward direction, are opposite to each other. Consequently, the locations of the electric motors 11a and 22a both having a high weight are separated from each other to the front side and the rear side of the robot 1, and displacement of the position of the center of gravity in the forward and rearward direction can be reduced.

As depicted in FIG. 5B, the electric motors 11a and 22a of the two actuators 11 and 22 do not overlap with each other as viewed in side elevation of the robot 1. In particular, a front face 11g of the electric motor 11a of the yawing actuator 11 is spaced from a rear face 22g of the electric motor 22a of the leg actuators 22 in the forward and rearward direction. The case 11d of the yawing actuator 11 overlaps with the cases 22d of the leg actuators 22 as viewed in side elevation.

As depicted in FIGS. 4B and 5B, the three actuators 11 and 22 placed side by side in the leftward and rightward direction are arranged such that the rotation center lines A11, B11, A22, and B22 thereof are directed in the upward and downward direction. Further, the rotation center lines A11 and A22 of the rotation outputting sections 11c and 22c and the rotation center lines B11 and B22 of the electric motors 11a and 22a are spaced from each other in the forward and rearward direction. This arrangement of the three actuators 11 and 22 can suppress increase of the size of the robot 1 in the leftward and rightward direction.

It is to be noted that the layout of the yawing actuator 11 and the leg actuators 22 is not limited to that of the robot 1. For example, while the rotation outputting section 11c of the yawing actuator 11 is spaced rearwardly from the electric motor 11a of the yawing actuator 11, the rotation outputting section 22c of the leg actuators 22 may be spaced forwardly from the electric motor 22a of the leg actuators 22. As another example, in the actuators 11 and 22, the rotation outputting sections 11c and 22c may be arranged on same axial lines with the electric motors 11a and 22a, respectively.

As a further example, in the yawing actuator 11, the rotation center line B11 of the electric motor 11a and the rotation center line A11 of the rotation outputting section 11c may be perpendicular to each other. In this case, the speed reduction mechanism 11b may include a worm gear or a helical gear. Similarly, in the leg actuators 22, the rotation center line B22 of the electric motor 22a and the rotation center line A22 of the rotation outputting section 22c may be perpendicular to each other. In this case, the speed reduction mechanism may include a worm gear or a helical gear. Also in such cases as described above, the direction in which the rotation outputting section 11c of the yawing actuator 11 is located with respect to the electric motor 11a and the direction in which the rotation outputting section 22c of the leg actuators 22 is located with respect to the electric motor 22a may be opposite to each other.

As a still further example, the position of the upper end 11f of the yawing actuator 11 may be higher than the upper end 22e of the left and right leg actuators 22. Further, the position of the lower end 11e of the yawing actuator 11 may be higher than the lower end 22f of the left and right leg actuators 22.

(Pitching Actuator)

As depicted in FIGS. 4A and 4B, the pitching actuator 12 is arranged above the yawing actuator 11. The pitching actuator 12 is supported by the yawing actuator 11. More particularly, a frame 62 that holds the pitching actuator 12 thereon is attached to the rotation outputting section 11c of the yawing actuator 11. The pitching actuator 12 and elements supported on the pitching actuator 12, more particularly, the rolling actuator 13 and an upper portion of the trunk 10, are rotated (yawing) around the rotation center line A11 extending along the upward and downward direction by driving of the yawing actuator 11.

As depicted in FIGS. 4B and 5B, the pitching actuator 12 is located above the upper end 22e of the left and right leg actuators 22. Also the location of the frame 62 (refer to FIG. 4A) that holds the pitching actuator 12 thereon is higher than the upper end 22e of the left and right leg actuators 22. By this arrangement, the frame 62 and the pitching actuator 12 can be prevented from interfering with the leg actuators 22 irrespective of the size of the pitching actuator 12 in the leftward and rightward direction. As a result, the movable range of the yawing actuator 11 can be secured sufficiently. As depicted in FIG. 4A, a right side portion and a left side portion of the frame 62 are located above the right side leg actuator 22, more particularly, above the electric motor 22a, and above the left side leg actuator 22, more particularly, above the electric motor 22a, respectively, and they overlap partly with the leg actuators 22 as viewed in top plan.

As depicted in FIG. 4B, the pitching actuator 12 includes an electric motor 12a, a speed reduction mechanism, and a rotation outputting section 12c that receives rotation of the electric motor 12a through the speed reduction mechanism. The rotation outputting section 12c is located on the rotation center line A12 of the electric motor 12a. The speed reduction mechanism is arranged between the rotation outputting section 12c and the electric motor 12a. For such a speed reduction mechanism as just described, for example, a planetary gear can be used.

(Rolling Actuator)

As depicted in FIG. 5B, the rolling actuator 13 is arranged in the rear of the pitching actuator 12. Further, the rolling actuator 13 is located above the electric motor 11a of the yawing actuator 11. The rolling actuator 13 and an upper portion of the trunk 10 are supported by the pitching actuator 12 such that they move (pitching) around the rotation center line A12 of the pitching actuator 12 extending along the leftward and rightward direction by driving the pitching actuator 12. In other words, the trunk 10 can be tilted to the front by driving of the pitching actuator 12.

Figure 2A:
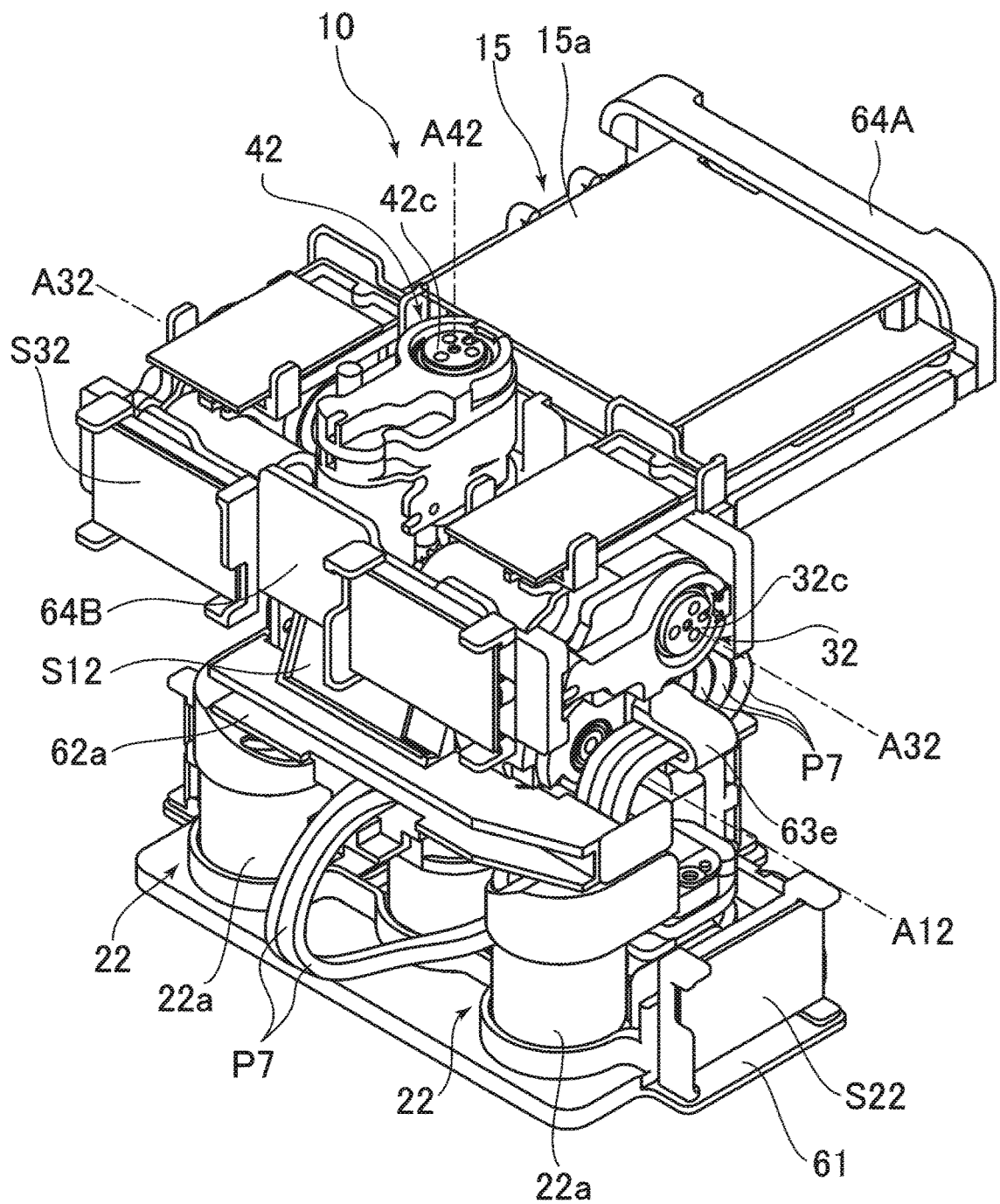
FIG. 2A is a perspective view depicting parts configuring a trunk.
Figure 2B:
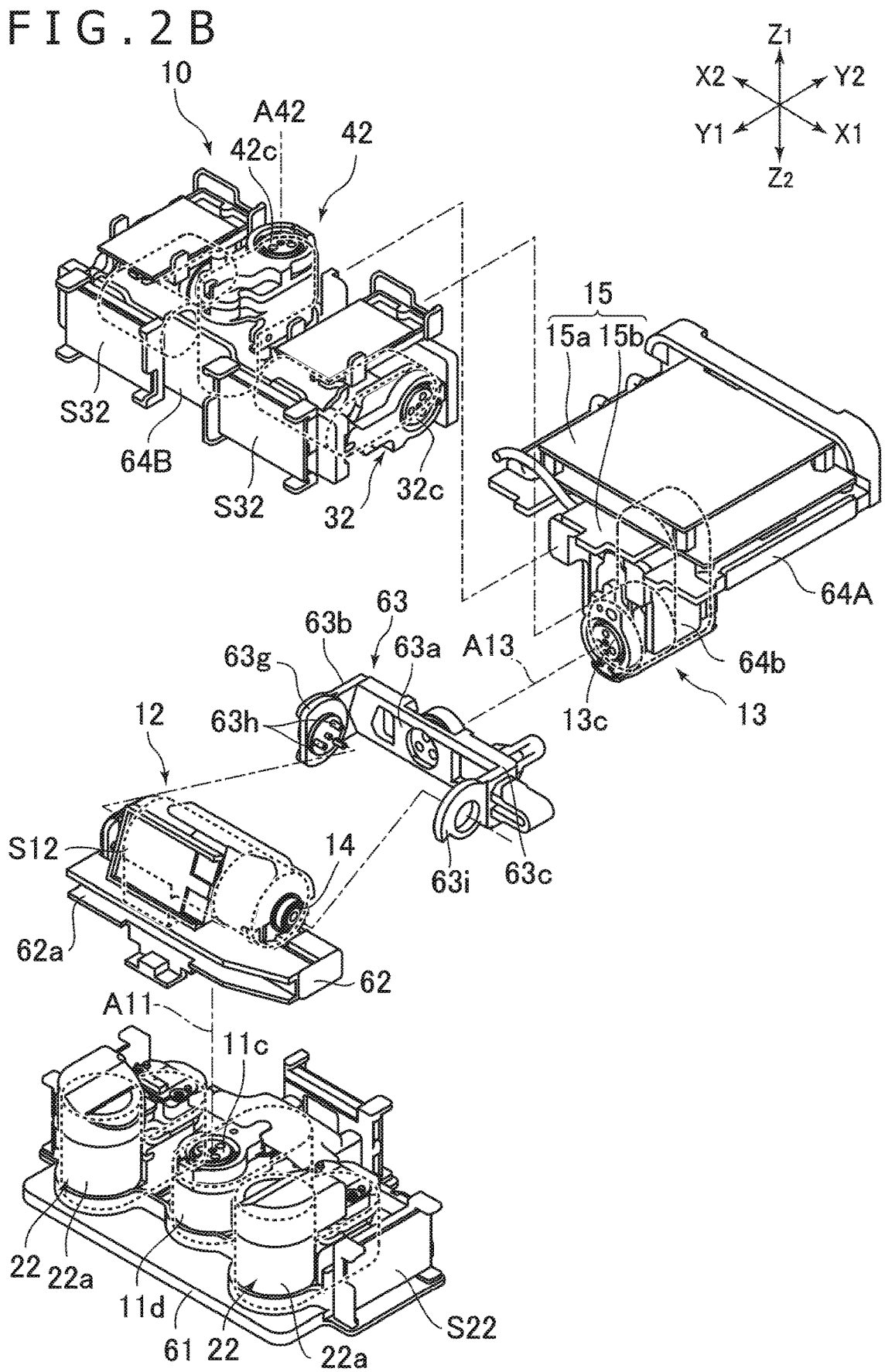
FIG. 2B is an exploded perspective view of the parts depicted in FIG. 2A.
Figure 3A:
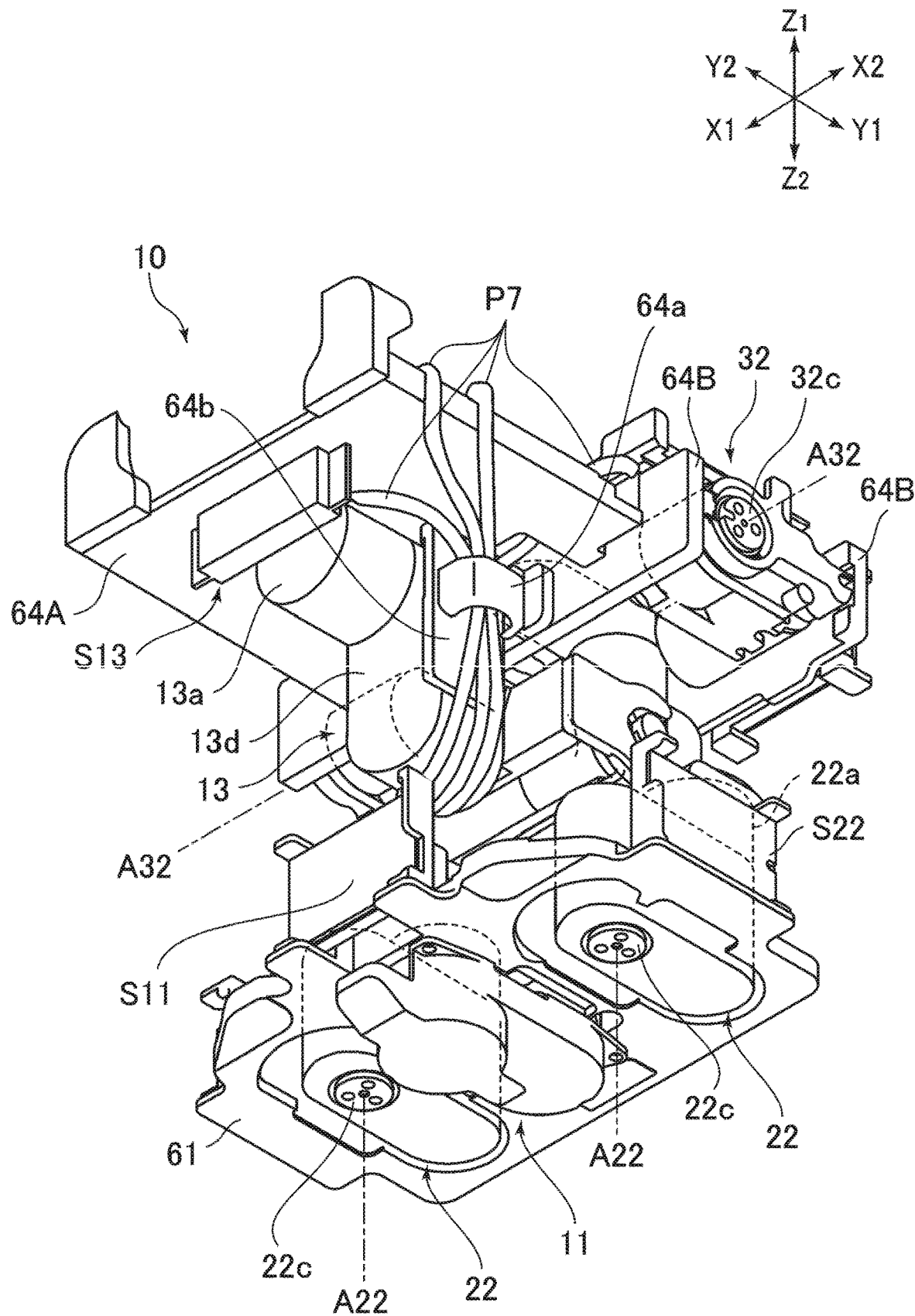
FIG. 3A is a perspective view depicting parts configuring the trunk.
Figure 3B:
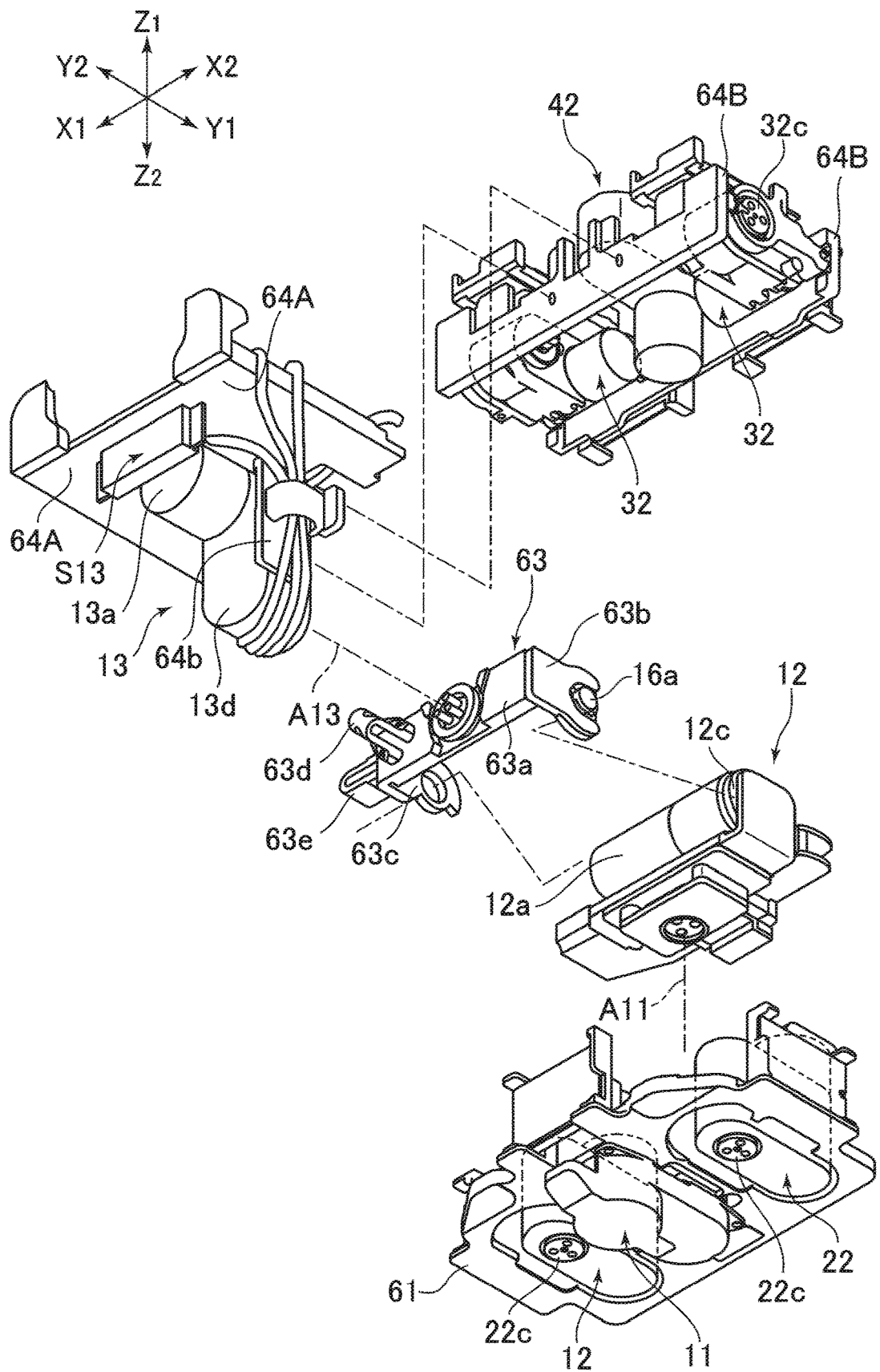
FIG. 3B is an exploded perspective view of the parts depicted in FIG. 3A.

As depicted in FIGS. 2B and 3B, a connection frame 63 is attached to the rotation outputting section 12c of the pitching actuator 12. The rolling actuator 13 is attached to the connection frame 63. The connection frame 63 has a supporting portion 63a arranged, for example, along the rotation center line A12 of the pitching actuator 12, a first arm portion 63b extending from one end portion of the supporting portion 63a toward the rotation outputting section 12c and attached to the rotation outputting section 12c through a first attached portion 63g hereinafter described, and a second arm portion 63c extending from an opposite side end portion of the supporting portion 63a toward the rotation center line A12. The second arm portion 63c is supported by a bearing 14 (refer to FIG. 2B) on the opposite side to the rotation outputting section 12c on the rotation center line A12.

As depicted in FIGS. 2B and 3B, the rolling actuator 13 includes the electric motor 13a, a speed reduction mechanism, and the rotation outputting section 13c that receives rotation of the electric motor 13a through the speed reduction mechanism. The structure of the rolling actuator 13 may be same as that of the yawing actuator 11. As depicted in FIG. 2B, the rotation outputting section 13c of the rolling actuator 13 is attached to the supporting portion 63a of the connection frame 63. On the other hand, an upper portion of the trunk 10 is supported by the remaining portion of the rolling actuator 13. In particular, frames 64A and 64B that support a main board 15, the shoulder actuators 32, and the head actuator 42 thereon are attached to a case 13d (refer to FIG. 3B) that accommodates the speed reduction mechanism of the rolling actuator 13. The frame 64A has a pair of attachment wall portions 64b (refer to FIG. 3B) extending downwardly. The case 13d is arranged between the attachment wall portions 64b and attached to the attachment wall portions 64b.

If the rolling actuator 13 is driven, then the case 13d in which the electric motor 13a and the speed reduction mechanism are accommodated is rotated around the rotation center line A13 (refer to FIG. 2B) of the rotation outputting section 13c. As a result, the upper portion of the trunk 10 is tilted leftwardly or rightwardly (rolling).

As depicted in FIG. 5B, the electric motor 13a is spaced upwardly from the rotation center line A13 of the rotation outputting section 13c. The upper portion of the trunk 10, namely, the portion that holds the shoulder actuators 32 and the head actuator 42, is located above the electric motor 13a. By this location, the distance from the rotation center line A13 of the rolling actuator 13 to the upper portion of the trunk 10 can be secured sufficiently. As a result, the movement of the upper portion of the trunk 10, namely, tilting in the leftward or rightward direction, can be made greater. The case 13d is located below the electric motor 13a. The upper portion of the trunk 10 is fixed to the case 13d through the attachment wall portions 64b. To the case 13d, the upper portion of the trunk 10 is fixed through the attachment wall portions 64b. It is to be noted that, different from the example of the robot 1, the upper portion of the trunk 10 may be attached to the electric motor 13a in place of the case 13d.

(Layout of Three Actuators)

As described hereinabove, the pitching actuator 12 is disposed above the yawing actuator 11, and the rolling actuator 13 is arranged in the rear of the pitching actuator 12. The upper portion of the trunk 10, namely, the portion at which the shoulder actuators 32 and the head actuator 42 are arranged, is arranged above the rolling actuator 13 and is supported by the rolling actuator 13. According to this arrangement of the three actuators 11, 12, and 13, when the pitching actuator 12 is driven, namely, when the trunk 10 is tilted to the front, the pitching actuator 12 or the rolling actuator 13 does not interfere with any other part. As a result, the range of forward tilting of the trunk 10 can be secured sufficiently. Further, since a space S1 (refer to FIG. 4A) is secured on the lower side of a right portion and the lower side of a left portion of the trunk 10, when the rolling actuator 13 is driven, namely, when the trunk 10 is tilted leftwardly or rightwardly, the upper portion of the trunk 10 does not interfere with any other part. As a result, also the range of tilting of the trunk 10 to the right and the left can be secured sufficiently.

As depicted in FIGS. 4B and 5B, the rotation center line A11 of the yawing actuator 11 and the rotation center line A12 of the pitching actuator 12 may define one plane. In other words, the rotation center line A11 and the rotation center line A12 may intersect with each other as viewed in both the side elevation and the front elevation of the robot 1. According to this arrangement of the actuators 11 and 12, calculation of the posture of the trunk 10 can be simplified. Further, according to this arrangement of the actuators 11 and 12, the moment of inertia of the pitching actuator 12 around the rotation center line A11 of the yawing actuator 11 decreases. As a result, the torque demanded for the yawing actuator 11 can be reduced.

Further, as depicted in FIGS. 4B and 5B, the rotation center line A12 of the pitching actuator 12 and the rotation center line A13 of the rolling actuator 13 may define one plane. In other words, the rotation center line A12 of the pitching actuator 12 and the rotation center line A13 of the rolling actuator 13 may intersect with each other as viewed in both the side elevation and the front elevation. According to this arrangement of the actuators 12 and 13, calculation of the posture of the trunk 10 can be simplified.

For the three actuators 11, 12, and 13, two kinds of actuators are used. In particular, a parallel actuator is used as the yawing actuator 11 and the rolling actuator 13, and a serial actuator is used as the pitching actuator 12. The parallel actuator is an actuator in which rotation center lines of a rotation outputting section and an electric motor that are connected to each other through a speed reduction mechanism are spaced from each other in a radial direction of the electric motor. The serial actuator is an actuator in which rotation center lines of a rotation outputting section and an electric motor connected to each other through a speed reduction mechanism are same as each other.

Since, in the parallel actuator, the rotation center line of the rotation outputting section is spaced in a radial director from the center rotation axis of the electric motor, the size of the parallel actuator in a direction along the rotation center line is smaller than that in the serial actuator. In contrast, the size of the serial actuator in a direction orthogonal to the rotation center line is smaller than that of the parallel actuator. In the robot 1, a serial actuator is used as the pitching actuator 12, and a parallel actuator is used as the rolling actuator 13. By this, the overall size of the two actuators 12 and 13 in the forward and rearward direction can be reduced. As a result, a moment of inertia of the two actuators 12 and 13 generated around the rotation center line A11 of the yawing actuator 11 can be reduced. Further, in the robot 1, a parallel actuator is used as the yawing actuator 11. By this, the location of the rotation outputting section 11c of the yawing actuator 11 can be lowered and the position of the center of gravity of the robot 1 can be lowered.

It is to be noted that the electric motor 11a and the rotation outputting section 11c of the yawing actuator 11 correspond to the "supported portion" and the "movable portion" in the claims, respectively. Further, the electric motor 12a and the rotation outputting section 12c of the pitching actuator 12 correspond to the "supported portion" and the "movable portion," respectively. Further, in regard to the rolling actuator 13, since the rotation outputting section 13c of it is supported by the pitching actuator 12 through the connection frame 63, the electric motor 13a and the rotation outputting section 13c of the rolling actuator 13 correspond to the "movable portion" and the "supported portion" in the claims, respectively.

(Upper Portion of Trunk)

As depicted hereinabove, the upper portion of the trunk 10 is supported by the rolling actuator 13. As depicted in FIG. 2A, the left and right shoulder actuators 32, the head actuator 42, and the main board 15 are arranged at the upper portion of the trunk 10. In the example of the robot 1, the main board 15 includes two circuit boards 15a and 15b placed one on the other in the upward and downward direction as depicted in FIG. 2B. By this configuration, a narrow space can be utilized effectively. Different from the example of the robot 1, the main board 15 may include one circuit board. As the shoulder actuators 32 and the head actuator 42, for example, a parallel actuator is used.

As depicted in FIG. 5B, the shoulder actuators 32 are arranged forwardly with respect to the rolling actuator 13. According to this arrangement, the degree of freedom of the location of the shoulder actuators 32 in the upward and downward direction can be increased. In the robot 1, the lower end 32e of the shoulder actuators 32 is positioned lower than the upper end 13e of the rolling actuator 13, in the example of the robot 1, lower than the upper face of the electric motor 13a. According to this arrangement of the shoulder actuators 32, the position of the center of gravity of the robot 1 can be lowered, and therefore, the stability of movement of the robot 1 can be improved. In the example of the robot 1, the shoulder actuators 32 are arranged such that a horizontal plane P1 that passes the upper end 13e of the rolling actuator 13 intersects with the rotation outputting section 32c of the shoulder actuators 32.

As depicted in FIG. 4B, the head actuator 42 is located between the left and right shoulder actuators 32 and is located in front of the rolling actuator 13 similarly to the shoulder actuators 32. According to this arrangement, the degree of freedom of the location of the head actuator 42 in the upward and downward direction can be increased. In the robot 1, the lower end 42e of the head actuator 42 may be positioned lower than the upper end 13e of the rolling actuator 13, in the example of the robot 1, lower than the upper face of the electric motor 13a (refer to FIG. 5). According to this arrangement of the head actuator 42, since the position of the center of gravity of the robot 1 can be lowered, the stability of movement of the robot 1 can be improved.

As viewed in side elevation of the robot 1, the shoulder actuators 32 and the head actuator 42 are located above the pitching actuator 12. As depicted in FIG. 4A, a space S1 that allows rolling of the trunk 10 therein is secured on the lower side of the shoulder actuators 32 and the head actuator 42.

A rotation center line A32 of a rotation outputting section 32c of the shoulder actuators 32 extends in the leftward and rightward direction, and the shoulder actuators 32 move the arm portions 30R and 30L forwardly and rearwardly. A rotation center line A42 (refer to FIG. 2A) of a rotation outputting section 42c of the head actuator 42 extends in the upward and downward direction, and the head actuator 42 rotates the orientation of the head leftwardly and rightwardly.

The movement of the shoulder actuators 32 and the head actuator 42 is not limited to that of the robot 1. For example, the rotation center line A32 of the shoulder actuators 32 arranged at the upper portion of the trunk 10 may extend in the forward and rearward direction or may extend in the upward and downward direction. Similarly, the rotation center line A42 of the head actuator 42 arranged at the upper portion of the trunk 10 may extend in the forward and rearward direction or may extend in the leftward and rightward direction.

Also the layout of the shoulder actuators 32 and the head actuator 42 is not limited to that of the robot 1. For example, only the shoulder actuators 32 or the head actuator 42 may be located in front of the rolling actuator 13, and the position of the lower end of it may be lower than the upper end 13e of the rolling actuator 13. In a further example, the location of both the shoulder actuators 32 and the head actuator 42 may be higher than the upper end 13*e* of the rolling actuator 13.

As depicted in FIG. 5A, the main board 15 is located in the rear of the shoulder actuators 32 and the head actuator 42 and is located above the rolling actuator 13. The main board 15 is arranged horizontally. The shoulder actuators 32 and the head actuator 42 are located lower than the main board 15. In particular, as depicted in FIG. 5B, the lower end 32*e* of the shoulder actuators 32 and the lower end 42*e* (refer to FIG. 4B) of the head actuator 42 are located lower than the main board 15, in the example of the robot 1, lower than the lower side circuit board 15*b*. Especially, in the shoulder actuators 32, also the rotation center line A32 thereof is located lower than the main board 15, in the example of the robot 1, lower than the lower side circuit board 15*b*.

As depicted in FIGS. 2B and 3B, the shoulder actuators 32, the head actuator 42, and the main board 15 are attached to the frames 64A and 64B. In particular, the main board 15 is attached to the frame 64A, and the shoulder actuators 32 and the head actuator 42 are held by the frame 64B. The two frames 64A and 64B are combined in the forward and rearward direction. In particular, the frame 64A is positioned in the rear of the frame 64B and is secured to the frame 64B by a fixing element such as a screw. The rolling actuator 13 is fixed to the frame 64A through the attachment wall portions 64*b*. It is to be noted that the structure of the frames 64A and 64B is not limited to that of the robot 1. They may be an integrally formed member. In other words, the frames 64A and 64B may not be fixed to each other by a fixing element such as a screw but may be formed as a continuous member by a single time casting step or metal working.

(Board and Electric Cable)

The main board 15 has a circuit for connecting to an external apparatus such as, for example, a computer for controlling the robot 1 or a power supply device. The actuators 11, 12, 13, and 22 have servo boards S11, S12, S13, and S22 provided thereon, respectively. In the following description, where the servo boards are not distinguished from each other, each servo board is referred to as servo board S. Each servo board S supplies electric power to an actuator such that the actuator implements a movement according to an instruction received from the main board 15. The servo board S is attached to a frame on which an actuator controlled by the servo board S is supported. For example, the servo board S1*l* (refer to FIG. 3A) that controls the yawing actuator 11 and the servo board S22 (refer to FIG. 3A) that controls the leg actuators 22 are attached to the frame 61 on which the actuators 11 and 22 are supported. Meanwhile, the servo board S12 (refer to FIG. 2B) that controls the pitching actuator 12 is attached to the frame 62 on which the pitching actuator 12 is supported. Further, the servo board S13 (refer to FIG. 3B) that controls the rolling actuator 13 and the servo board S32 (refer to FIG. 2B) that controls the shoulder actuators 32 are attached to the frame 64B on which the actuators 13 and 32 are mounted.

In the robot 1, a plurality of servo boards S are connected in series. For example, the servo boards S of the actuators 11, 12, and 13 for moving the trunk 10 and the servo boards S of the three actuators 11, 12, and 13 (refer to FIG. 1) provided on the head are connected in series. By the connection, the number of wirings can be reduced. The number of servo boards S to be connected in series may be more than three. For example, also the servo boards for the actuators 42, 43, and 44 for moving the head may be connected in series to the servo boards S11, S12, and S13.

The robot 1 has a plurality of electric cables P7 (refer to FIG. 3A) connected to a plurality of servo boards S and extending from the main board 15. The plurality of electric cables P7 include cables for supplying electric power from the main board 15 to the servo boards S, cables for sending control signals from the main board 15 to the servo boards S and so forth.

As depicted in FIG. 3A, the electric cables P7 are arranged along an outer face, namely, along a lower face, of the rolling actuator 13 and then extend forwardly toward the pitching actuator 12 as depicted in FIG. 2A. To the frame 64A on which the rolling actuator 13 is held, a clamp member 64*a* (refer to FIG. 3A) for fixing the electric cables P7 is attached. Also to the connection frame 63 that connects the pitching actuator 12 and the rolling actuator 13 to each other, clamp members 63*d* and 63*e* (refer to FIG. 5A) are attached. After passing through the three clamp members 64*a*, 63*d*, and 63*e*, the electric cables P7 pass a side portion of the pitching actuator 12 and further extend downwardly. As depicted in FIG. 5A, the electric cables P7 extend downwardly intersecting with the rotation center line A12 of the pitching actuator 12, in other words, with the rotation center line of the connection frame 63. The frame 62 has a cable guide 62*a* (refer to FIG. 2A) formed on the lower side of the pitching actuator 12. The electric cables P7 passing the rotation center line A12 of the pitching actuator 12 extend toward the cable guide 62*a*. The location of the electric cables P7 is defined by the cable guide 62*a* and the clamp member 63*e*. By laying out the electric cables P7 in this manner, the load that is to act upon the electric cables P7 when the pitching actuator 12 is driven can be reduced.

(Connection Frame)

The connection frame 63 attached to the pitching actuator 12 is described with reference to FIGS. 7A to 9B. It is to be noted that the structure of the connection frame 63 described below may be applied to an actuator different from the pitching actuator 12. Referring to FIG. 1, the structure of the connection frame 63 described below may be applied, for example, to the actuator 43 arranged on the head portion, the actuator 23 located at an upper portion of the leg portions 20R and 20L, and the actuators 33 and 35 of the arm portions 30R and 30L. In particular, in a case where a connected part, for example, a second actuator located next, is located in a direction orthogonal to the rotation center line of a first actuator, the structure of the connection frame 63 may be applied to a connection frame that is attached to a rotation outputting section of the first actuator. In the following description regarding the connection frame 63, the pitching actuator 12 is referred to merely as actuator.

Figure 7A:
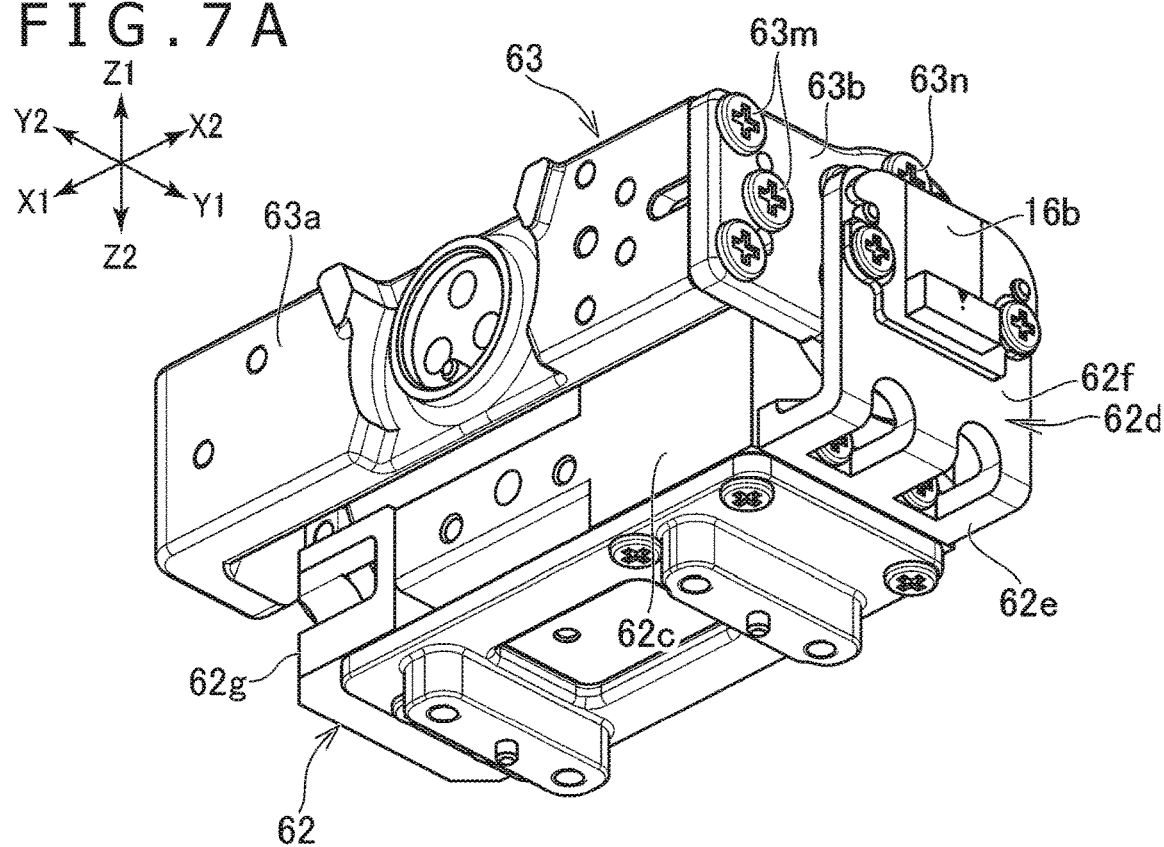
FIG. 7A is a perspective view of a pitching actuator to which a connection frame is attached and a frame.
Figure 7B:
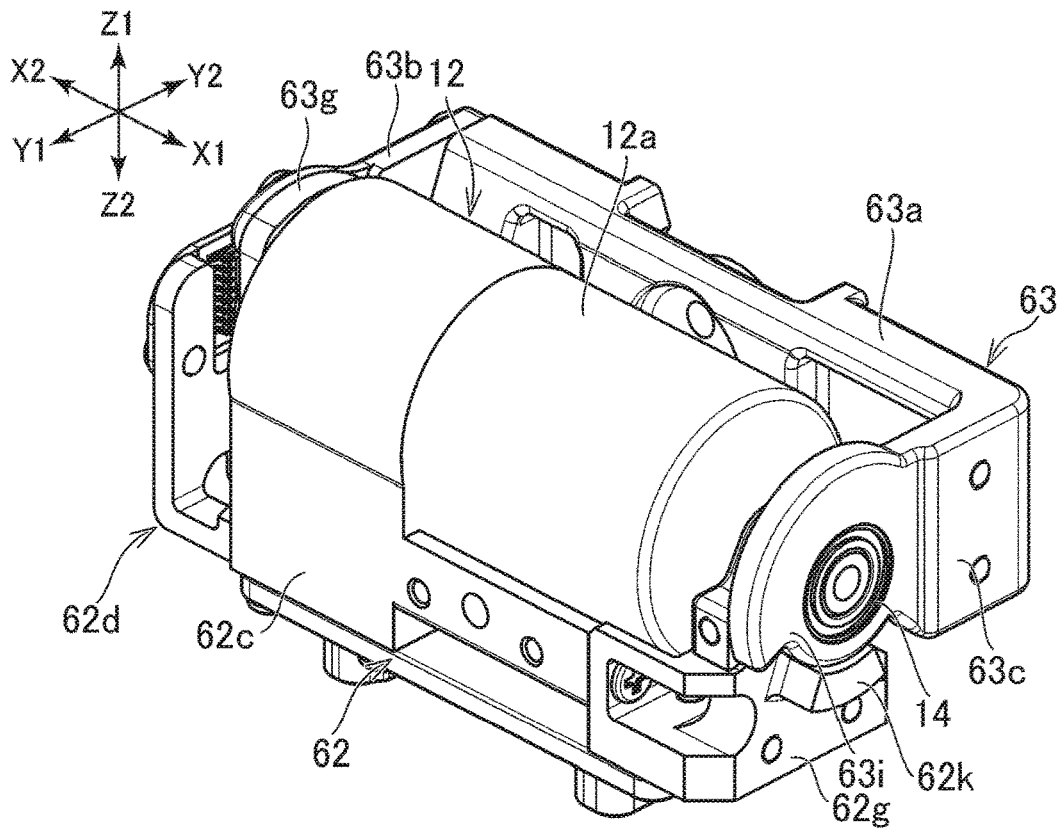
FIG. 7B is a perspective view of the parts depicted in FIG. 7A as viewed from another angle.

As depicted in FIGS. 7A and 7B, the connection frame 63 has a substantially U shape and is arranged such that it sandwiches the actuator 12 on the rotation center line A12 of the actuator 12. The connection frame 63 has a first attached portion 63*g* (refer to FIGS. 2B and 7C) attached to the rotation outputting section 12*c* (refer to FIG. 4A) of the actuator 12. The first attached portion 63*g* faces the rotation outputting section 12*c* in a direction along the rotation center line A12. The first attached portion 63*g* is attached to the rotation outputting section 12*c*, for example, by a plurality of screws 63*h*, for example, three screws 63*h*.

As depicted in FIG. 7B, the bearing 14 is arranged on the opposite side to the rotation outputting section 12*c* across the actuator 12. The connection frame 63 has, on the opposite side thereof to the first attached portion 63*g*, a second attached portion 63*i* attached to the bearing 14. The second attached portion 63*i* is an annular portion formed at a base portion of the second arm portion 63*c*. The bearing 14 is fitted on the inner side of the second attached portion 63i. The remaining portion of the connection frame 63, namely, the portion other than the first attached portion 63g, further has the supporting portion 63a and the first arm portion 63b. The first attached portion 63g and the second attached portion 63i are connected to each other through the first arm portion 63b, the supporting portion 63a, and the second arm portion 63c. The rolling actuator 13 is attached to the supporting portion 63a (refer to FIG. 2B). By driving of the pitching actuator 12, the connection frame 63 rotates relative to the actuator 12 and the frame 62 around the rotation center line A12.

In the example of the robot 1, the second arm portion 63c and the supporting portion 63a are formed integrally. In particular, the second arm portion 63c and the supporting portion 63a are not fixed to each other by a fixing element such as a screw but are formed as a continuous member by a casting step or a metal working. On the other hand, the first arm portion 63b is a member formed separately from the first attached portion 63g and the supporting portion 63a. The first arm portion 63b is attached to the first attached portion 63g and the supporting portion 63a by fixing elements such as, for example, screws 63n and 63m.

Figure 7C:
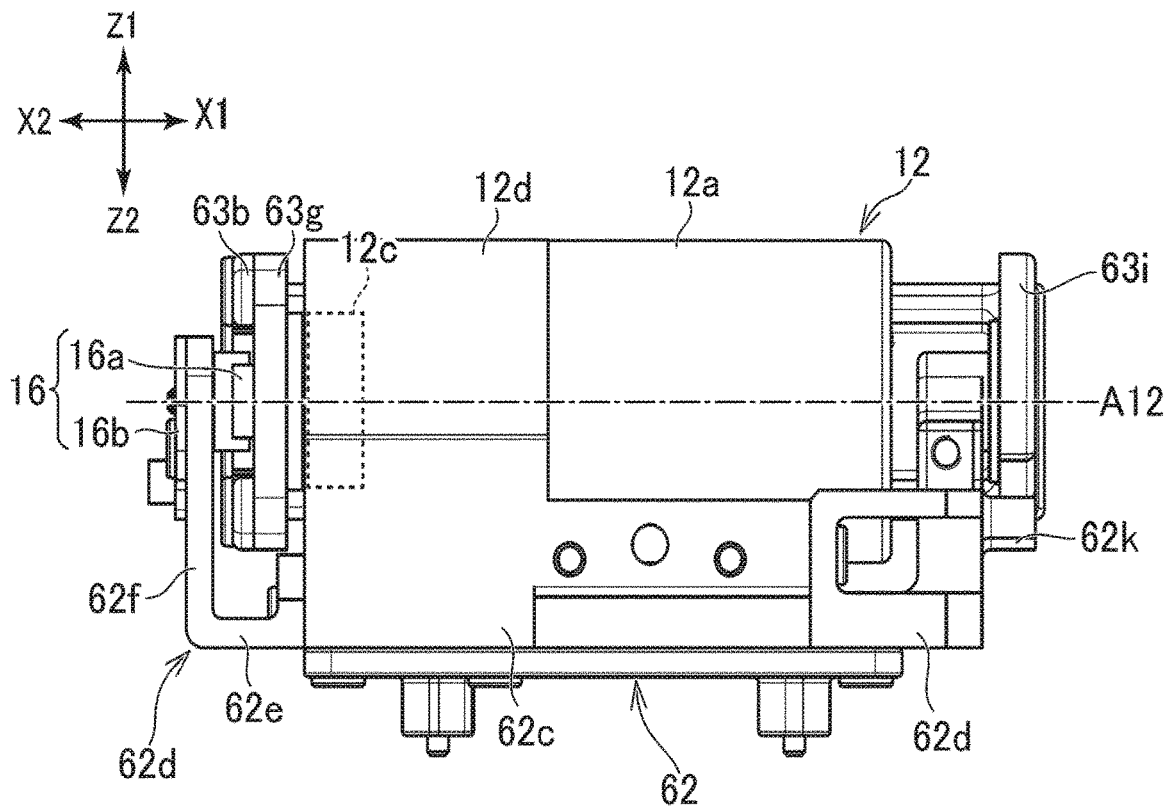
FIG. 7C is a top plan view of the parts depicted in FIG. 7A.

The robot 1 includes a rotation sensor 16 for detecting a movement and a location of the actuator 12. As depicted in FIGS. 7A and 7C, the rotation sensor 16 has a sensor rotation portion 16a attached to the connection frame 63 and a sensor fixed portion 16b that faces the sensor rotation portion 16a in a direction along the rotation center line A12. The rotation sensor 16 is a magnetic angle sensor that detects rotation using, for example, a change of magnetic fluxes. The sensor rotation portion 16a is, for example, a magnet. The sensor fixed portion 16b is a sensor board on which, for example, a Hall integrated circuit (IC) is mounted and outputs a signal according to a magnetic flux change arising from rotation of the sensor rotation portion 16a. Depending upon the place where the pitching actuator 12 and the connection frame 63 are used, the sensor rotation portion 16a may be a sensor board and the sensor fixed portion 16b may be a magnet.

(Movable Range of First Attached Portion)

Figure 9A:
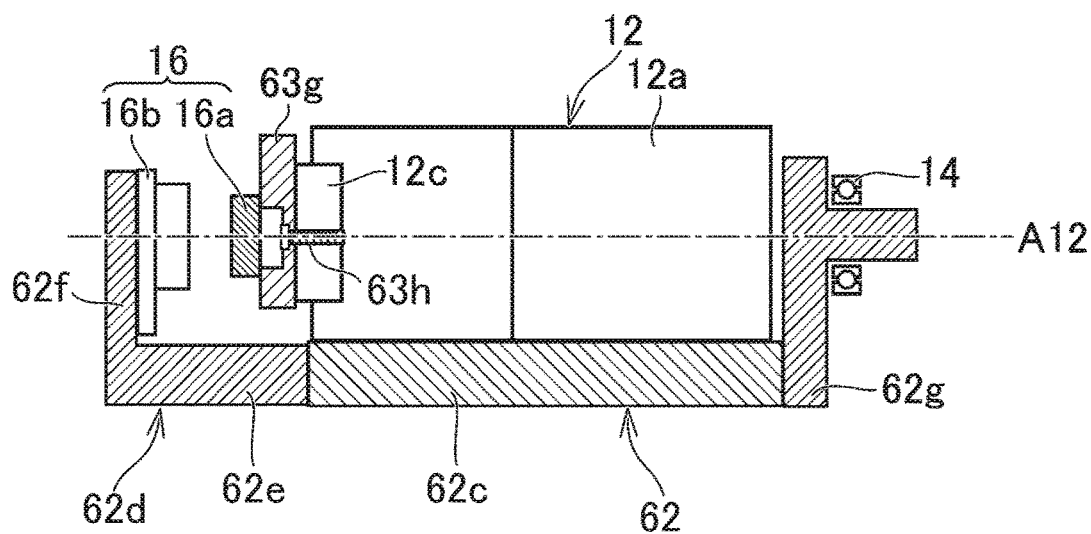
FIG. 9A is a schematic view depicting the connection frame and a rotation sensor upon execution of calibration.

The sensor rotation portion 16a is attached not to the first arm portion 63b but to the first attached portion 63g. The sensor rotation portion 16a is located on the rotation center line A12 of the actuator 12. As depicted in FIG. 9A, the first attached portion 63g is attached to the rotation outputting section 12c. The remaining portions of the connection frame 63, namely, the first arm portion 63b, the supporting portion 63a, and the second arm portion 63c, can be removed from the first attached portion 63g. In this state, the first attached portion 63g and the rotation outputting section 12c are rotatable around the rotation center line A12 over an angle greater than 360 degrees (one rotation). In short, when the first attached portion 63g and the rotation outputting section 12c are rotated over an angle greater than 360 degrees, they do not interfere with any of the other parts, members, and portions. In the example of the robot 1, when the first attached portion 63g and the rotation outputting section 12c are rotated, they do not interfere with the frame 62 on which the actuator 12 is supported.

As depicted in FIG. 9A, in the state in which the rotation sensor 16 is attached to the first attached portion 63g of the connection frame 63, calibration of the rotation sensor 16 can be performed. On the other hand, in a case in which the remaining portions of the connection frame 63 are removed from the first attached portion 63g, the first attached portion 63g and the rotation outputting section 12c are rotatable over an angle greater than 360 degrees, in other words, there is no limitation to the rotational range of the first attached portion 63g and the rotation outputting section 12c. Therefore, by performing calibration in this state, the calibration can be performed accurately.

(Frame and First Attached Portion)

The frame 62 on which the actuator 12 is supported has a main body 62c attached to the actuator 12 and a sensor supporting section 62d as depicted in FIG. 7A. Further, the frame 62 may have a bearing supporting section 62g (refer to FIG. 7B) that supports the bearing 14 thereon. As depicted in FIG. 7B, the bearing supporting section 62g has a supporting portion 62k that supports thereon an outer edge of the second attached portion 63i of the connection frame 63 attached to the bearing 14.

The sensor fixed portion 16b, particularly the sensor board, is attached to the sensor supporting section 62d. The sensor supporting section 62d is attached to the main body 62c by a fixing element such as a screw. According to this structure of the frame 62, it is possible to perform, in a state in which the sensor supporting section 62d is removed from the main body 62c, a work for attaching the first attached portion 63g to the rotation outputting section 12c by the screws 63h, and the attachment work of the first attached portion 63g is facilitated.

As depicted in FIG. 7A, the sensor supporting section 62d has a connection portion 62e extending in a direction along the rotation center line A12 from the main body 62c and a side portion 62f extending from the connection portion 62e toward the rotation center line A12. The sensor fixed portion 16b is attached to the side portion 62f.

Figure 8:
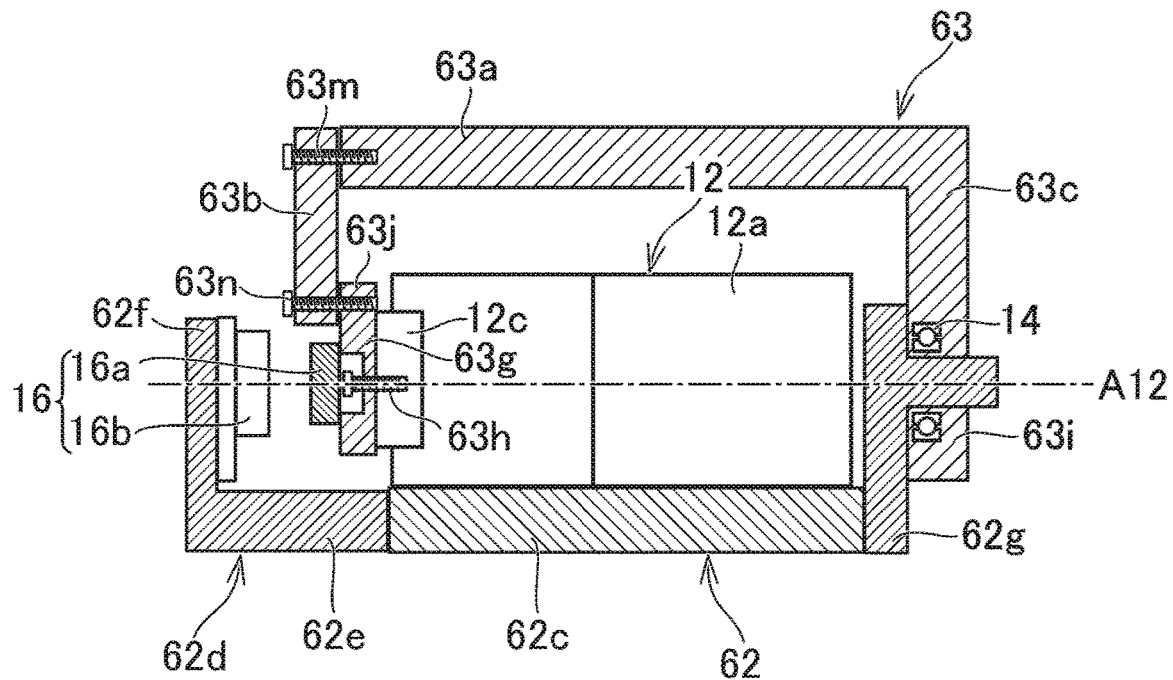
FIG. 8 is a schematic view of the connection frame, the pitching actuator, and the frame.

As depicted in FIG. 8, the first attached portion 63g has a remotest portion 63j located most apart from the rotation center line A12 of the rotation outputting section 12c of the actuator 12. The distance from the rotation center line A12 to the remotest portion 63j is smaller than the distance from the rotation center line A12 to the frame 62, more particularly, than the distance from the rotation center line A12 to the connection portion 62e of the frame 62, namely, than the length of a perpendicular line from the rotation center line A12 to the connection portion 62e. Since the first attached portion 63g is formed with such a size as just described, the first attached portion 63g and the rotation outputting section 12c are rotatable over an angle greater than 360 degrees. It is to be noted that the rotation outputting section 12c is located on the inner side with respect to the outer edge of the first attached portion 63g.

(Attachment Structure of First Attached Portion and First Arm Portion)

Figure 7D:
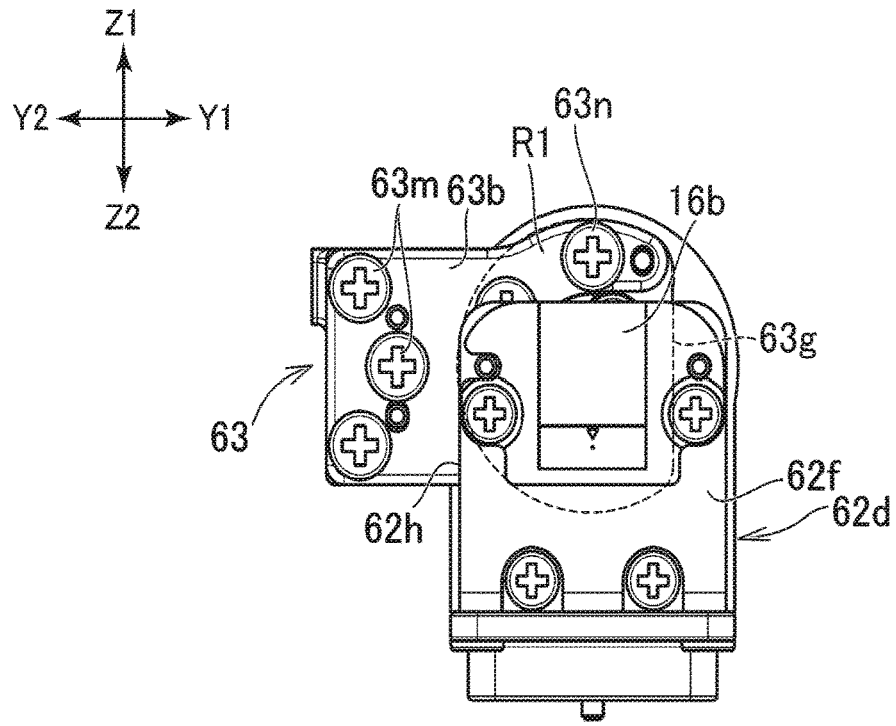
FIG. 7D is a side elevational view of the parts depicted in FIG. 7A.

As depicted in FIG. 7D, when the actuator 12 is viewed in a direction along the rotation center line A12, the first attached portion 63g and the first arm portion 63b have a region R1 in which they are not covered with the side portion 62f of the frame 62, namely, a region formed outside an outer edge 62h of the side portion 62f of the frame 62. The first arm portion 63b and the first attached portion 63g are fixed to each other by a plurality of fixing elements inserted in attachment holes formed in the region R1, particularly by screws 63n as depicted in FIG. 7D. According to this structure, it is possible to attach the first arm portion 63b to the first attached portion 63g without removing the sensor supporting section 62d, to which the sensor fixed portion 16b, namely, the sensor board, of the rotation sensor 16 for which calibration is completed, is fixed, from the main body 62c of the frame 62.

The region R1 includes an overall region that is exposed on the outer side of the outer edge 62h of the side portion 62f of the frame 62 by rotating the first arm portion 63b and the first attached portion 63g around the rotation center line A12. Accordingly, the region R1 includes also a portion covered with the side portion 62f when the rotational position of the first arm portion 63b is fixed at a certain angle, and also in the covered portion, fixing elements, particularly the screws 63n, are inserted. According to this structure, the number of attachment locations between the first arm portion 63b and the first attached portion 63g can be increased, and the durability of the connection frame 63 can be enhanced.

(Remaining Portion of Connection Frame)

The remaining portion of the connection frame 63 can be divided. In particular, portions that have the first arm portion 63b and the second attached portion 63i are connected to each other by fixing elements such as screws 63n and can be separated from each other. Therefore, the second attached portion 63i can be fitted with the bearing 14 in a direction along the rotation center line A12. In addition, the fixing elements, namely, the screws 63n, can be inserted into the first arm portion 63b and the first attached portion 63g in a direction along the rotation center line A12. Therefore, the number of fixing elements such as the screws 63n can be increased easily in comparison with that in an alternative structure in which, for example, the first attached portion 63g and the first arm portion 63b are fixed to each other in a radial direction. Therefore, the durability and the strength of the connection frame 63 can be enhanced.

Figure 9B:
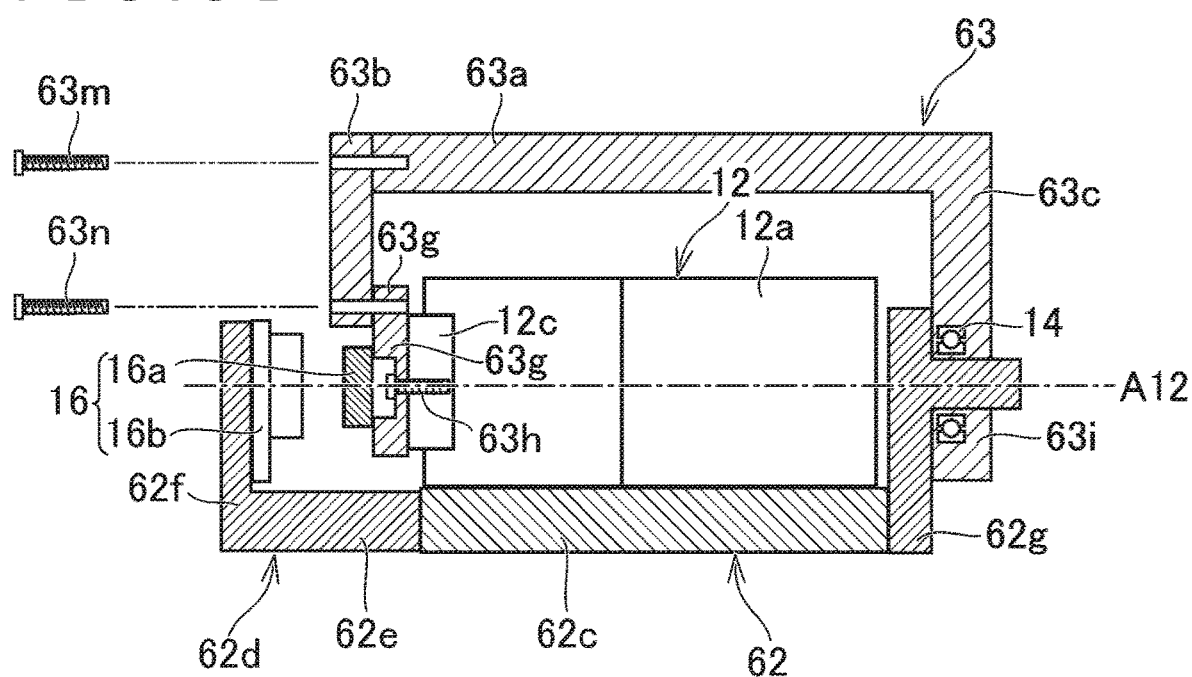
FIG. 9B is a view illustrating an assembly process of the connection frame performed after calibration.

In the example of the robot 1, the second attached portion 63i is part of the second arm portion 63c, and the second arm portion 63c and the supporting portion 63a configure a single member formed integrally, as described hereinabove. The supporting portion 63a and the first arm portion 63b are fixed to each other by a plurality of screws 63m (refer to FIG. 7A). In a manufacturing process of the robot 1, after calibration is completed, the first arm portion 63b is attached to the first attached portion 63g with the screws 63n as depicted in FIG. 9B. Further, the second attached portion 63i is fitted into the bearing 14, and then the first arm portion 63b and the supporting portion 63a are fixed to each other by the screws 63m.

Different from the example of the robot 1, the first arm portion 63b and the supporting portion 63a may configure one member formed integrally, and the supporting portion 63a and the second arm portion 63c may be fixed to each other by screws. In a further example, the first arm portion 63b, the supporting portion 63a, and the second arm portion 63c may form one member formed integrally by casting or metal working.

(Summary)

(1) As described above, the robot 1 includes the yawing actuator 11 that allows yawing of the trunk 10, the pitching actuator 12 that is arranged above the yawing actuator 11 and is supported by the yawing actuator 11, the pitching actuator 12 allowing pitching of the trunk 10, and the rolling actuator 13 that is arranged in the rear of the pitching actuator 12 and is supported by the pitching actuator 12, the rolling actuator 13 allowing rolling of the trunk 10. According to the robot 1, the tilting range to the front of the trunk 10 can be secured, and the tilting range in the leftward and rightward direction of the trunk 10 can be secured.

(2) Further, the robot 1 includes the leg actuators 22 that move the leg portions 20 and the yawing actuator 11 that is located between the left and right leg actuators 22 as viewed in front elevation of the robot 1 and allows yawing of the trunk 10. Further, the robot 1 includes the actuators 12 and 13 that are arranged above the yawing actuator 11 and allow pitching of the trunk 10 and rolling of the trunk 10, respectively. According to this robot, since the position of the actuators 11, 12, and 13 for moving the trunk 10 can be lowered as a whole, the position of the center of gravity of the robot 1 is lowered and the stability in movement of the robot 1 can be improved. It is to be noted that, in the structure just described, only one of the pitching actuator 12 and the rolling actuator 13 may be provided as an actuator to be arranged above the yawing actuator 11, namely, as the actuator that moves the trunk 10. Further, in this structure, only one of the pitching actuator 12 and the rolling actuator 13 may be an actuator to be arranged above the yawing actuator 11, namely, as the actuator for moving the trunk 10.

(3) The pitching actuator 12 and the rolling actuator 13 are arranged side by side in the forward and rearward direction of the robot 1. While the pitching actuator 12 is a serial actuator, the rolling actuator 13 is a parallel actuator. In particular, in the pitching actuator 12, the rotation center line A12 of the rotation outputting section 12c is same as the rotation center line of the electric motor 12a. Meanwhile, in the rolling actuator 13, the rotation center line A13 of the rotation outputting section 13c is spaced in a radial direction of the electric motor 13a from the rotation center line B13 of the electric motor 13a. By this structure, the size of the trunk 10 of the robot 1 in the forward and rearward direction can be reduced.

(4) The connection frame 63 has the first attached portion 63g attached to the rotation outputting section 12c of the pitching actuator 12, and the remaining portion connected to the first attached portion 63g, namely, the first arm portion 63b, the supporting portion 63a, and the second arm portion 63c. The rotation sensor 16 has the sensor rotation portion 16a attached to the first attached portion 63g, and the sensor fixed portion 16b facing the sensor rotation portion 16a. The rotation sensor 16 outputs a signal according to rotation of the sensor rotation portion 16a with respect to the sensor fixed portion 16b. In a state in which the first attached portion 63g is attached to the rotation outputting section 12c and the remaining portion of the connection frame is removed from the first attached portion 63g, the first attached portion 63g and the rotation outputting section 12c are rotatable over an angle greater than 360 degrees.

According to the structure of (4), calibration of the rotation sensor 16 can be performed in a state in which the sensor rotation portion 16a of the rotation sensor 16 is attached to the first attached portion 63g of the connection frame 63. Further, in a state in which the remaining portion of the connection frame 63 is removed from the first attached portion 63g, since the first attached portion 63g can rotate over an angle greater than 360 degrees, in other words, since there is no limit to the range of rotation of the first attached portion 63g, calibration can be performed accurately by performing the calibration in this state.

It is to be noted that the structure of the connection frame 63 described in (4) above may be applied to an actuator different from the pitching actuator 12. Referring to FIG. 1, the structure of the connection frame 63 described in (4) above may be applied, for example, to the actuator 43 arranged on the head portion, the actuator 23 located at an upper portion of the leg portions 20R and 20L, and the actuators 33 and 35 of the arm portions 30R and 30L.

The pitching actuator 12 is a serial actuator in which the rotation center line of the rotation outputting section and the rotation center line of the electric motor are same as each other. However, the connection frame 63 described in (4) above may be applied to a parallel actuator in which the rotation center line of the rotation outputting section is spaced away from the rotation center line of the electric motor. In this case, the first attached portion 63g may be attached to the rotation outputting section of the actuator, and the second attached portion 63i of the connection frame 63 may be attached to the bearing located on the opposite side to the actuator, which is the speed reduction mechanism, across the rotation outputting section.

In the example of the robot 1, the rolling actuator 13 is attached as a connected part to the connection frame 63. However, the connected part may not be the actuator but may be a frame configuring the arm portions 30R and 30L of the robot 1 or a frame configuring the leg portions 20R and 20L.

In a still further example, depending upon the location of the actuator to which the connection frame 63 is attached, the location of the connection frame 63 may be fixed, and the actuator and the frame that supports the actuator may be moved relative to the connection frame 63 by driving of the actuator. In this case, a board on which a Hall IC is mounted as the sensor rotation portion 16a may be attached to the connection frame 63, and a magnet may be attached as the sensor fixed portion 16b on a frame that supports the actuator.

It should be understood by those skilled in the art that various modifications, combinations, sub-combinations and alterations may occur depending on design requirements and other factors insofar as they are within the scope of the appended claims or the equivalents thereof.

What is claimed is:
1. A robot comprising:
a yawing actuator that allows yawing of a trunk of the robot;
a pitching actuator that is arranged above the yawing actuator and is supported by the yawing actuator, the pitching actuator allowing pitching of the trunk; and
a rolling actuator that is arranged in a rear of the pitching actuator and is supported by the pitching actuator, the rolling actuator allowing rolling of the trunk, wherein:
the yawing actuator has a supported portion and a movable portion rotatable with respect to the supported portion around a rotation center line extending along an upward and downward direction of the robot,
the pitching actuator has a supported portion supported by the movable portion of the yawing actuator and a movable portion rotatable with respect to the supported portion of the pitching actuator around a rotation center line extending in a leftward and rightward direction of the robot, and
the rolling actuator has a supported portion supported by the movable portion of the pitching actuator and a movable portion rotatable with respect to the supported portion of the rolling actuator around a rotation center line extending along a forward and rearward direction of the robot.

2. The robot according to claim 1, wherein the rotation center line, which extends along the leftward and rightward direction, of the pitching actuator and the rotation center line, which extends along the forward and rearward direction, of the rolling actuator define one plane.

3. The robot according to claim 1, wherein the rotation center line, which extends along the upward and downward direction, of the yawing actuator and the rotation center line, which extends along the leftward and rightward direction, of the pitching actuator define one plane.

4. The robot according to claim 1, wherein
the rolling actuator includes an electric motor, a speed reduction mechanism, and a rotation outputting section that receives rotation of the electric motor through the speed reduction mechanism,
the rotation outputting section of the rolling actuator is supported by the pitching actuator, and
the electric motor of the rolling actuator is spaced upwardly from a rotation center line of the rotation outputting section, and an upper portion of the trunk is located above the electric motor and is supported by the rolling actuator.

5. The robot according to claim 1, further comprising:
a shoulder actuator that is supported by the rolling actuator and moves an arm of the robot; and
a head actuator that is supported by the rolling actuator and moves a head of the robot, wherein
at least one of the shoulder actuator and the head actuator is located in front of the rolling actuator as viewed in side elevation of the robot.

6. The robot according to claim 5, wherein a position of a lower end of at least one of the shoulder actuator and the head actuator is lower than a position of an upper end of the rolling actuator as viewed in side elevation of the robot.

7. The robot according to claim 1, further comprising:
a circuit board that is arranged above the rolling actuator and is supported by the rolling actuator; and
a shoulder actuator that is supported by the rolling actuator and moves an arm portion of the robot and a head actuator that is supported by the rolling actuator and moves a head of the robot, wherein
a position of a lower end of at least one of the shoulder actuator and the head actuator is lower than the circuit board as viewed in side elevation of the robot.

8. The robot according to claim 1, further comprising:
a left leg actuator that is located at an upper portion of a left leg portion of the robot and moves the left leg portion; and
a right leg actuator that is located at an upper portion of a right leg portion of the robot and moves the right leg portion, wherein
the yawing actuator is located between the right leg actuator and the left leg actuator as viewed in front elevation of the robot.

9. The robot according to claim 1, wherein
the pitching actuator includes an electric motor, a speed reduction mechanism, and a rotation outputting section that receives rotation of the electric motor through the speed reduction mechanism, the rotation outputting section being rotatable around a first center line extending along a leftward and rightward direction of the robot,
the rolling actuator includes an electric motor, a speed reduction mechanism, and a rotation outputting section that receives rotation of the electric motor through the speed reduction mechanism, the rotation outputting section being rotatable around a second center line extending along a forward and rearward direction of the robot,
a center of rotation of the electric motor in the pitching actuator is located on the first center line, and
a center of rotation of the electric motor in the rolling actuator is spaced in a radial direction of the electric motor from the second center line.

10. A robot comprising:
a left leg actuator that is located at an upper portion of a left leg portion of the robot and moves the left leg portion;

a right leg actuator that is located at an upper portion of a right leg portion of the robot and moves the right leg portion;

a yawing actuator that is located between the right leg actuator and the left leg actuator as viewed in front elevation of the robot and allows yawing of a trunk of the robot; and at least one actuator that is arranged above the yawing actuator and allows pitching of the trunk or rolling of the trunk, wherein at least one of:

at least part of the yawing actuator overlaps with the left leg actuator and the right leg actuator as viewed in side elevation;

a position of an upper end of the yawing actuator is lower than a position of an upper end of the left leg actuator and an upper end of the right leg actuator; and a position of a lower end of the yawing actuator is lower than a position of a lower end of the left leg actuator and a lower end of the right leg actuator.

11. The robot according to claim 10, wherein, each of the yawing actuator, the right leg actuator, and the left leg actuator includes an electric motor, a speed reduction mechanism, and a rotation outputting section that receives rotation of the electric motor through the speed reduction mechanism, the rotation outputting section being rotatable around a rotation center line extending along an upward and downward direction of the robot, the rotation outputting section of the yawing actuator is spaced in one of forward and rearward directions of the robot from the electric motor, and the rotation outputting section of each of the right leg actuator and the left leg actuator is spaced in the other of the forward and rearward directions from the electric motor.

12. The robot according to claim 10, wherein, each of the yawing actuator, the right leg actuator, and the left leg actuator includes an electric motor and a rotation outputting section that receives rotation from the electric motor, and the electric motor of the yawing actuator is spaced from the electric motors of the right leg actuator and the left leg actuator.

* * * * *